United States Patent [19]

Ohkami

[11] Patent Number: 5,754,242
[45] Date of Patent: May 19, 1998

[54] DATA FORMATTING SYSTEM FOR PROCESSING MULTIPLE INDEPENDENT INPUT DATA STREAMS FOR HIGH RESOLUTION SCREEN DISPLAYS

[75] Inventor: Takahide Ohkami, Newton, Mass.

[73] Assignee: Mitsubishi Electric Information Technology Center America, Inc., Cambridge, Mass.

[21] Appl. No.: 643,265

[22] Filed: May 3, 1996

Related U.S. Application Data

[63] Continuation of Ser. No. 369,374, Jan. 6, 1995, abandoned.
[51] Int. Cl.$^6$ ............................. H04N 7/18; H04N 7/08
[52] U.S. Cl. .................. 348/441; 348/555; 348/558; 348/588; 345/121; 345/115
[58] Field of Search ................... 345/112, 116, 345/118–120, 202, 126–127, 132–133, 121; 348/554, 555, 556, 558, 588, 441

[56] References Cited

U.S. PATENT DOCUMENTS

| | | | |
|---|---|---|---|
| 4,714,428 | 12/1987 | Bunker et al. ................ | 345/118 |
| 4,949,279 | 8/1990 | Takakura et al. ............. | 345/162 |
| 4,962,463 | 10/1990 | Crossno et al. ............... | 345/112 |
| 5,129,013 | 7/1992 | Holzmann et al. ............ | 345/112 |
| 5,204,947 | 4/1993 | Bernstein et al. ............. | 345/119 |
| 5,257,113 | 10/1993 | Chen et al. ................... | 345/119 |
| 5,295,000 | 3/1994 | Nonoshita et al. ............ | 345/119 |
| 5,339,392 | 8/1994 | Risberg et al. | |
| 5,448,315 | 9/1995 | Soohoo ......................... | 348/722 |

*Primary Examiner*—Mark R. Powell
*Attorney, Agent, or Firm*—Robert K. Tendler

[57] ABSTRACT

A system is provided to enhance the capability of a display system which can format digital images of different types from multiple input data streams for a high-resolution screen of arbitrary shape and size, with the display system adapted to receive independent data streams from different data sources at the same time and control how and where the images from the data streams are presented on the screen in a type-independent manner. The screen layout is controlled by an active screen format that specifies which data streams are to be received, where on the screen to present the images and how to present the images. Type-independent data formatting is accomplished by choosing the preprocessing handler/transformation handler pair suitable for the type of a data stream and activating the handlers so that they restore images from the data stream and transform them to fit on the preallocated portion of the screen on the fly. In one embodiment, the data stream manager dynamically creates a data stream server for each data stream to maintain data structures for management and preprocess data, and, with the knowledge of the shape and size of the screen, the screen format manager allocates a screen area and creates a screen format server for each data stream to generate images from the data preprocessed by the data stream server by performing the specified transformation on them to fit on the preallocated screen portion.

17 Claims, 22 Drawing Sheets

DATA FORMATTING SYSTEM FOR PROCESSING MULTIPLE INDEPENDENT INPUT DATA STREAMS FOR HIGH RESOLUTION SCREEN DISPLAYS

This is a continuation of application Ser. No. 08/369,374 filed on Jan. 6, 1995, abandoned.

FIELD OF INVENTION

This invention relates to display systems and more particularly to a display system having processing capability for handling multiple data streams of different types for a high-resolution screen of arbitrary shape and size.

BACKGROUND OF THE INVENTION

Conventional display systems can handle only one data stream in the form of electrical signals in which images from the signals are restored and presented on the screen. In case of a CRT display system, the electrical signals are used to control the movement and intensity of electron beams from the RGB guns.

With a screen having a relatively small number of pixels, the conventional display system is designed to present only one data stream on the entire screen. For example, a display system with VGA resolution can handle 640×480 pixels, which are just enough to display a NTSC video data stream. Since many images available today fit on a screen with 640×480 pixels, conventional display systems with a screen having VGA resolution are widely used.

With the advances in technology, the number of pixels available on a single screen, that is, the screen resolution, has been increasing. Moreover, some technologies have been developed to tile screens together to form a larger logical screen with a large number of pixels in total.

A high-resolution screen of a large number of pixels allows a display system to present several images from different data streams at the same time. A display system with such a capability can be used in many applications, ranging from home entertainment systems to office and engineering systems for group work, to industrial systems to control complex facilities in teamwork. Information displayed on the large high-resolution screen in these systems includes various image data from a number of independent data sources.

For example, a VLSI design team can use such a display system with a high-resolution screen to display the entire chip layout with its details and some enlarged parts of interest along with other pieces of information, such as test patterns, control programs, simulation data and messages from engineers and management, which may come from different sources. Receiving information of timing errors from a simulation team, the design engineers in the team may enlarge the part related to the errors and create a window to show the logic diagram of that part for investigation.

A traffic control system is another example where several people work as a team using a display system with a high-resolution screen. Typically, the screen can show a map of local roads and video data from major intersections as well as weather information from the weather center, accident information from the police department, fire information from the fire department, and construction information from various utility companies. When an accident occurs at one of the major intersections, the users of the system may enlarge the video data from the site to take a close look at it. If the accident is not very serious, they may just adjust the timings of the traffic signals at the site by popping up a timing-control window for the traffic signals.

For these systems, the display system is required not only to handle multiple data streams, but also to format the images from these data streams in a content-independent manner, because people have to understand the situations clearly by formatting images in the way they want. The display system to be used for these applications is also required to have a high-level interface, much higher than the interface level of electrical signals, to accept, for example, compressed image data, graphics object descriptions and text data, as well as raw image data. This is because different data sources send data streams of different types. In general, the higher the interface of the display system, the lower the cost of communications between the display system and data source.

Many conventional display systems can not be used for these applications, mainly because they do not have a high-resolution screen to display so many pieces of information at the same time. Moreover, even those with a high-resolution screen can not be used because they can not handle multiple data streams from different sources at the same time. They have no ability for content-independent formatting of data streams, since they do not have any data processing capability. Their interface for data streams is so low, at the level of electrical signals, that they can not provide any higher-level interface.

A conventional display system is often used with a computer, which drives the display system with its display control board. The computer has the capability of taking multiple data streams from different data sources and merging them together into a single data stream for the attached display system. The computer also has some ability for formatting data streams, especially graphics data streams by accepting high-level graphics commands. Thus, a conventional display system combined with a computer driving it can be considered as the functional equivalent of the display system required for the aforementioned applications. However, the computer is a separate system that is designed for general-purpose computing tasks and is not tuned for the display task. In fact, the display task is not the main task for the computer, but merely one of its I/O tasks, among which the storage control task is usually of highest priority.

The X Window System is a software system designed mainly to handle graphics for a computer with a high-resolution display system. The X server, a component of the X Window System, controls the display system, and the X client, another component of the X Window System, is a graphics application that issues graphics requests to the X server. The X server handles requests from different X clients, which share the same high-resolution screen, and manages windows created for the X clients. The X server's main task is to draw or erase graphics objects on the screen at the request of the X clients. It does not have any content-independent formatting capability. Thus, the use of the X Window System running on a computer with a high-resolution screen is very limited for the aforementioned applications.

A multi-screen display that tiles several unit screens to form a large screen is becoming popular at shopping plazas, train stations, airports, and so forth. The number of pixels available on the screen is the sum of the numbers of pixels per unit screen. However, the main function of such a multi-screen display system is to enlarge a single data stream, a video stream in most cases, by grouping several pixels. It is used to provide a physically large screen for the amount of information that could be displayed on a unit screen, but not to provide a high-resolution screen for more information by utilizing its pixels. The multi-screen display system often requires a special piece of equipment called a scan converter to enlarge video images and a switch to select one from several data streams. It is not a complete system in this sense. Thus, the multi-screen system is also very limited for the aforementioned applications.

In the aforementioned applications, the shape and size of the screen may vary depending on the applications. Many applications have been developed either for one of the standard screens or a custom-made screen. These applications need to be modified to support different screens. The modifications are not straightforward, because changing the shape or size of the screen often requires modifications to algorithms as well as data structures. This is very inconvenient. It is desirable that a display system itself take care of the screen it controls without requiring that every data source be aware of the shape and size of screen. No existing display systems have this kind of capability.

In summary, conventional display systems have the following problems. First, they can not handle multiple data streams without the help of additional equipment that merges them into a single data stream. Second, they do not have any capability of formatting a data stream in a content-independent manner, since their main function is to restore images from the electrical signals for display. Third, they do not provide a high-level interface to accept commands, such as those for resizing and polygon drawing, since they only have a very low-level interface to accept electrical signals. Finally, they do not have any capability of displaying data on a screen of different shape and size.

SUMMARY OF THE INVENTION

In order to overcome the disadvantages of conventional display systems, the present invention comprises a display system which has an information processing capability in which multiple data streams of different types are accepted from independent data sources at the same time, after which the digital images generated from the data streams are formatted to present these images on a screen of arbitrary shape and size in the way specified by the screen format chosen by the user. Specifically, the Subject System transforms the preprocessed data from the different sources into images on the screen in a type-independent manner on the fly.

In one aspect of the present invention, the display system preprocesses data streams from independent data sources with handlers chosen for their data types and then transforms the preprocessed data into images to fit on the screen, with handlers chosen for the transformations specified in the current screen format that dictates the total screen layout, and with the format dynamically chosen by the user.

The screen format that is active to control the total screen layout is designated as the current screen format, which is distinguished from other screen formats stored in the system. The display system is preprogrammed to make manual selection or automatic selection of the initial screen format when the system is booted up. The current screen format can be dynamically replaced by another screen format by a command from the user or an event caused by some conditions resulting from the operations in the system.

A screen format specifies the data streams to use and transformations of the images generated from the data streams. When a screen format becomes the current screen format, the display system checks all the data streams required for the format and communicates with the data sources of these data streams. The system chooses the handlers suitable for preprocessing and transformations specified by the screen format. The selection of a handler for preprocessing is based on the types of data in the data stream, since a different data type requires a different handler. The data types handled by the system includes raw digital images, compressed digital images, 2-D and 3-D graphics object descriptions, command scripts, texts, and so forth. The transformation handlers are chosen to transform preprocessed data into pixel images which are presented at the screen area specified by the current screen format. A transformation handler transforms images by transforming the coordinate system assumed by the data stream into one assumed at the specified screen area, thus transforming the corresponding images.

In one embodiment, the display system of the present invention consists of a console, a data stream manager, and a screen format manager. The console takes commands from the user and executes them. It also processes events such as those scheduled for some actions and those caused by some operations in the system. The main task of the console is to manage the overall display system. When the system is booted up, the console determines the initial screen layout by choosing one of the screen formats. Depending on the commands from the user, the console communicates with the data stream manager and screen format manager.

The data stream manager communicates with data sources and spawns a data stream server for each data stream. The data stream server manages data structures for the data stream and preprocesses data from the data stream using a handler suitable for the data type of the stream. Every time the data stream server receives a block of data from the data source, it updates the data structures for the data stream.

The screen format manager also spawns a screen format server for each data stream. A screen format server receives the preprocessed data from the data stream server created for a data stream. It transforms the preprocessed data into pixel images using a handler for the transformation specified by the current screen format. The screen format server then writes the generated pixels into the system's frame memory for display.

The console, the data stream manager, and the screen format manager are implemented as processes and they communicate with each other using interprocess communications. Data stream servers and screen format servers are also implemented as processes. A data stream server created for a data stream is paired with the screen format server created for the same data stream. Since these pairs work concurrently, the data structures shared between the servers are protected in an appropriate way using a lock-unlock mechanism.

In summary, a system is provided to enhance the capability of a display system which can format digital images of different types from multiple input data streams for a high-resolution screen of arbitrary shape and size, with the display system adapted to receive independent data streams from different data sources at the same time and control how and where the images from the data streams are presented on the screen in a type-independent manner. The screen layout is controlled by the active screen format that specifies which data streams to receive, where on the screen to present the images and how to present the images. Type-independent data formatting is accomplished by choosing the preprocessing handler/transformation handler pair suitable for the type of a data stream and activating the handlers so that they can restore images from the data stream and transform them to fit on the preallocated portion of the screen on the fly. In one embodiment, the data stream manager dynamically creates a data stream server for each data stream to maintain data structures for management and preprocess data, and, with the knowledge of the shape and size of the screen, the screen format manager allocates a screen area and creates a screen format server for each data stream to generate images from the data preprocessed by the data stream server by performing the specified transformation on them to fit on the preallocated screen portion.

BRIEF DESCRIPTION OF THE DRAWINGS

These and other features of the Subject Invention will be better understood taken in conjunction with the Detailed Description in conjunction with the Drawings of which.

DETAILED DESCRIPTION

Figure 1:
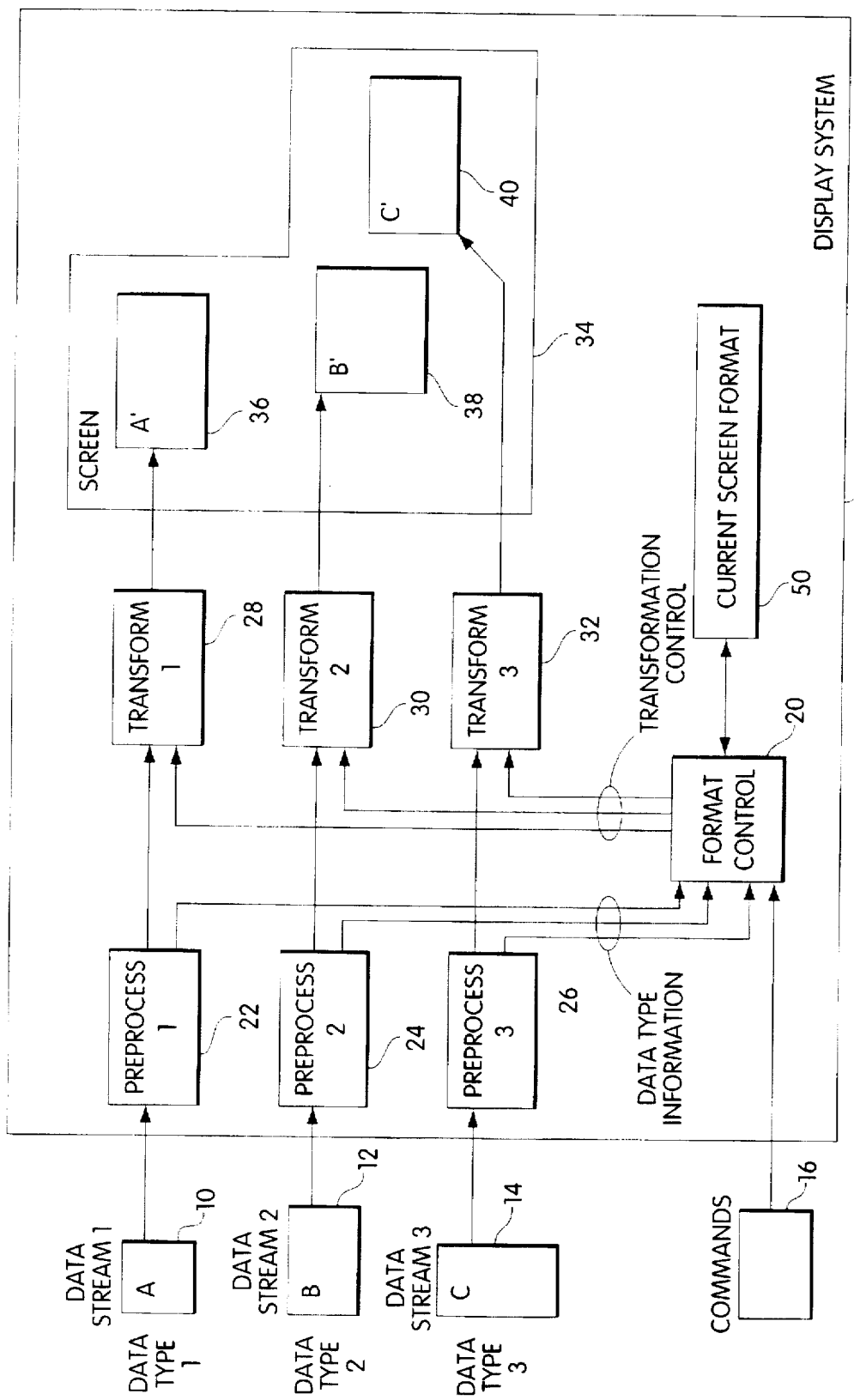
FIG. 1 is a block diagram of the Subject System illustrating multiple data streams of different types preprocessed and transformed to generate on screen images under the control of a format control unit.

Referring now to FIG. 1, data streams 10, 12, and 14 and command stream 16 are received by a display system 18, in which a format control unit 20 receives commands 16 from outside and controls preprocesses 22, 24, and 26 and transformations 28, 30, and 32 as specified by a current screen format 50. Data from data streams 10, 12, and 14 are preprocessed at 22, 24, and 26 and then transformed at 28, 30, and 32 to generate images 36, 38, and 40, respectively, on a screen 34. Current screen format 50 specifies which data streams to receive, how to preprocess them, how to transform them, and where to display them on the screen.

Data streams can be different in type. A data stream may be a video stream, a compressed video stream, a collection of still images, compressed or uncompressed, a list of graphics objects, text, or a command script. Preprocessing depends on the data type. For instance, preprocessing for a compressed video stream includes decompression of video frames, and preprocessing for a list of graphics objects includes generation of pixel images from the descriptions of graphics objects. The display system stores different handlers for different data types and chooses an appropriate one for a data stream, depending its data type. When a data stream changes its data type, the display system replaces the handler for the new data type on the fly.

Transformation for each data stream is specified by the current screen format. Data preprocessed by the data stream handler are transformed by the transformation handler to generate images on the screen area specified by the current screen format. One of the relatively simple transformations is resizing, i.e., changing the size of images. For instance, a simple transformation for doubling the size of images both horizontally and vertically may duplicate pixels so that four pixels in the transformed image correspond to a pixel in the original image. Since duplication is simple but not necessarily good for certain kinds of images including text, a more sophisticated transformation with a filtering capability may be required for resizing. The display system makes this kind of selection easy by choosing or replacing handlers for preprocessing and transformations.

Figure 2:
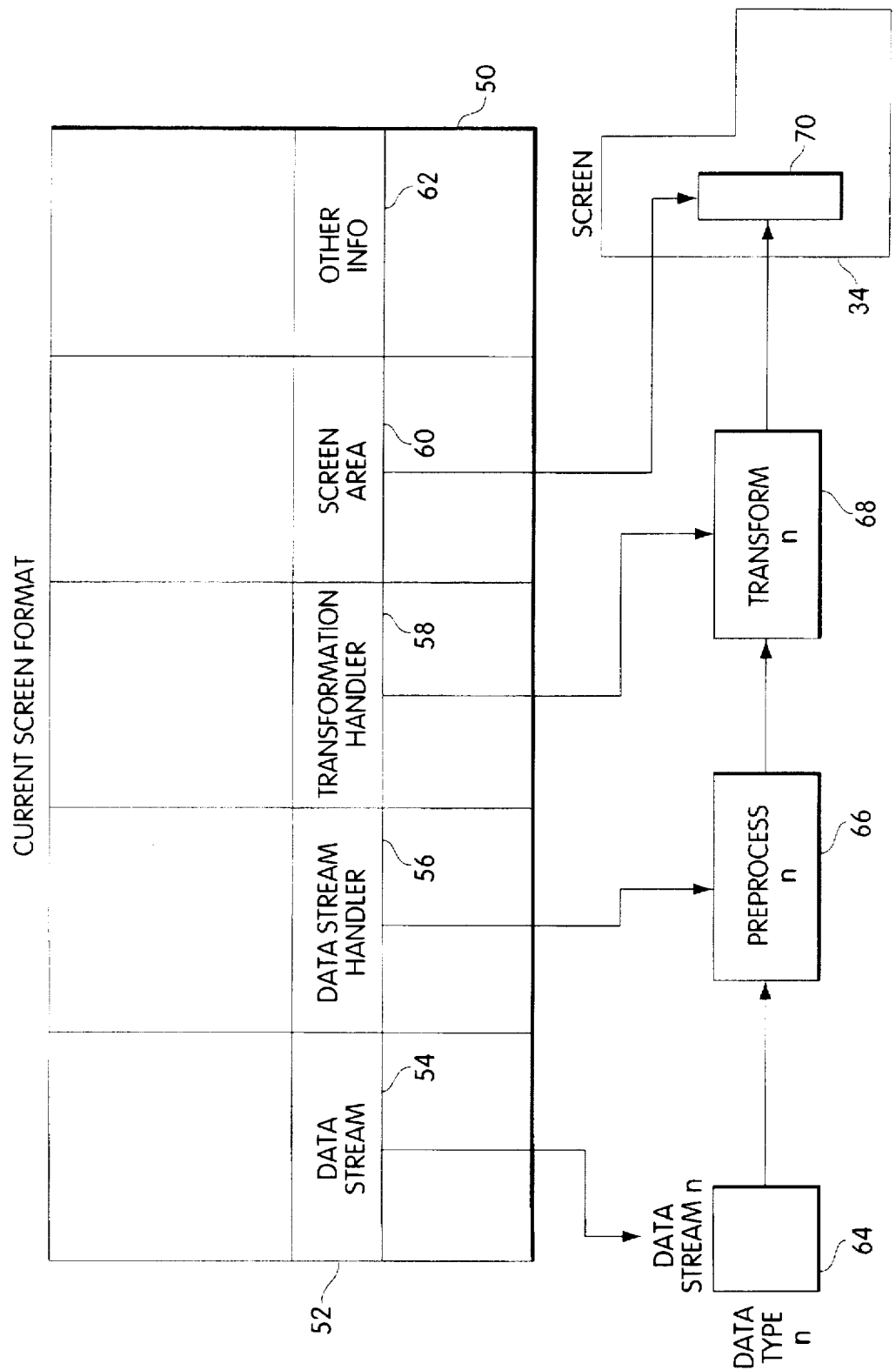
FIG. 2 is a block diagram illustrating current screen format to control the preprocessing and transformation of data from a data stream.

Referring to FIG. 2, the current screen format 50 is the active screen format to control the total screen layout and includes sets of items, one set for each data stream. Item set 52 for data stream 64 consists of data stream information 54, including the data type of data stream 64, data stream handler information 56 used in preprocess 66, transformation handler information 58 used in transformation 68, screen area information 60 specifying the screen area 70 on screen 34 for the images produced at 68, and other information 62. When the display system is booted up, one of the screen formats stored in the display system is chosen as the initial screen format and set as the current screen format. It can be replaced by another screen format when the command from the user is executed, or the action associated with the occurrence of a certain event is taken. Modifications may be made to the current screen format to reflect the status of the data streams. For instance, when a data stream ends, the item set for the data stream is removed from the current screen format, and when a new data stream starts, the item set for the data stream is created in the current screen format.

Figure 3A:
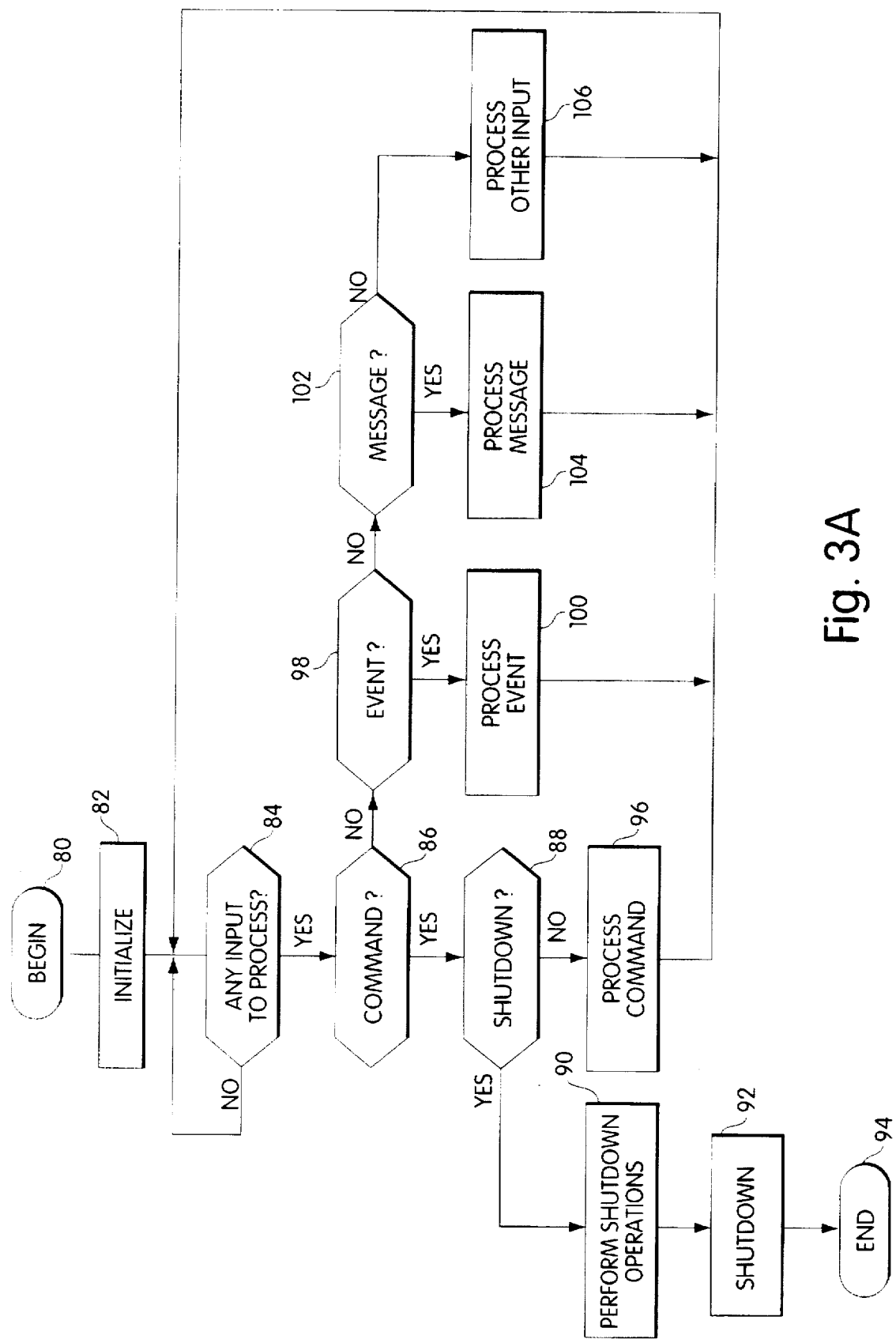
FIG. 3A is a flow chart describing the general operation of the Subject System to handle commands, events, and messages as inputs.

FIG. 3A shows a flow chart of the general operation of the Subject System to process commands, events, messages, and other inputs. The process starts at 80, in which the system is initialized at 82, and then checks to see if there is any input to process at 84. If there is no input to process, then the system keeps checking at 84 until it receives an input to process. If the input is a command from outside at 86 and it is a shutdown command at 88, then the process performs shutdown operations at 90, shutdowns the system at 92, and ends at 94. If the command at 86 is not a shutdown command, then the command is processed at 96, and the process waits for another input at 84. If the input is an event at 98, then it is processed at 100, and the process looks for another input at 84. If the input is a message from a data source at 102, then it is processed at 104, and the process waits for another input at 84. If the input is not a message at 102, then it is processed at 106, and the process waits for another input at 84.

Figure 3B:
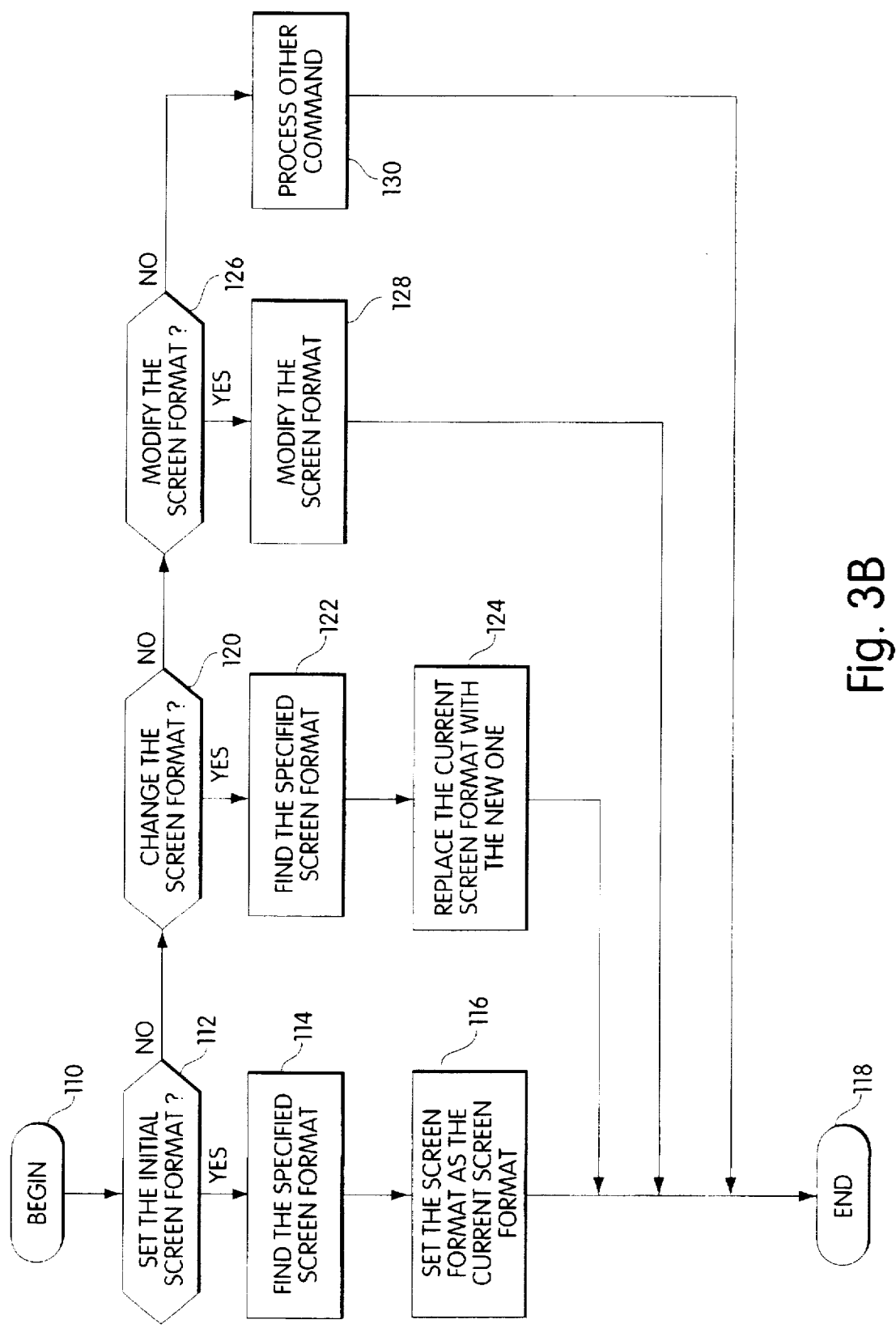
FIG. 3B is a flow chart describing the operation of the Subject System to process commands.

FIG. 3B shows a flow chart of the operation of the Subject System to handle commands other than the shutdown command. The process begins at 110. If the command is to set the initial screen format at the boot-up time at 112, then the process finds the specified screen format at 114, sets it as the current screen format at 116, and ends at 118. If the command is to change the current screen format at 120, then the process finds the new screen format at 122, replaces the current screen format with the new one at 124, and ends at 118. If the command is to modify the screen format at 126, then the process modifies the current screen format at 128 and ends at 118. If the command is not to modify the current screen format at 126, then it is processes at 130, and the process ends at 118.

Figure 3C:
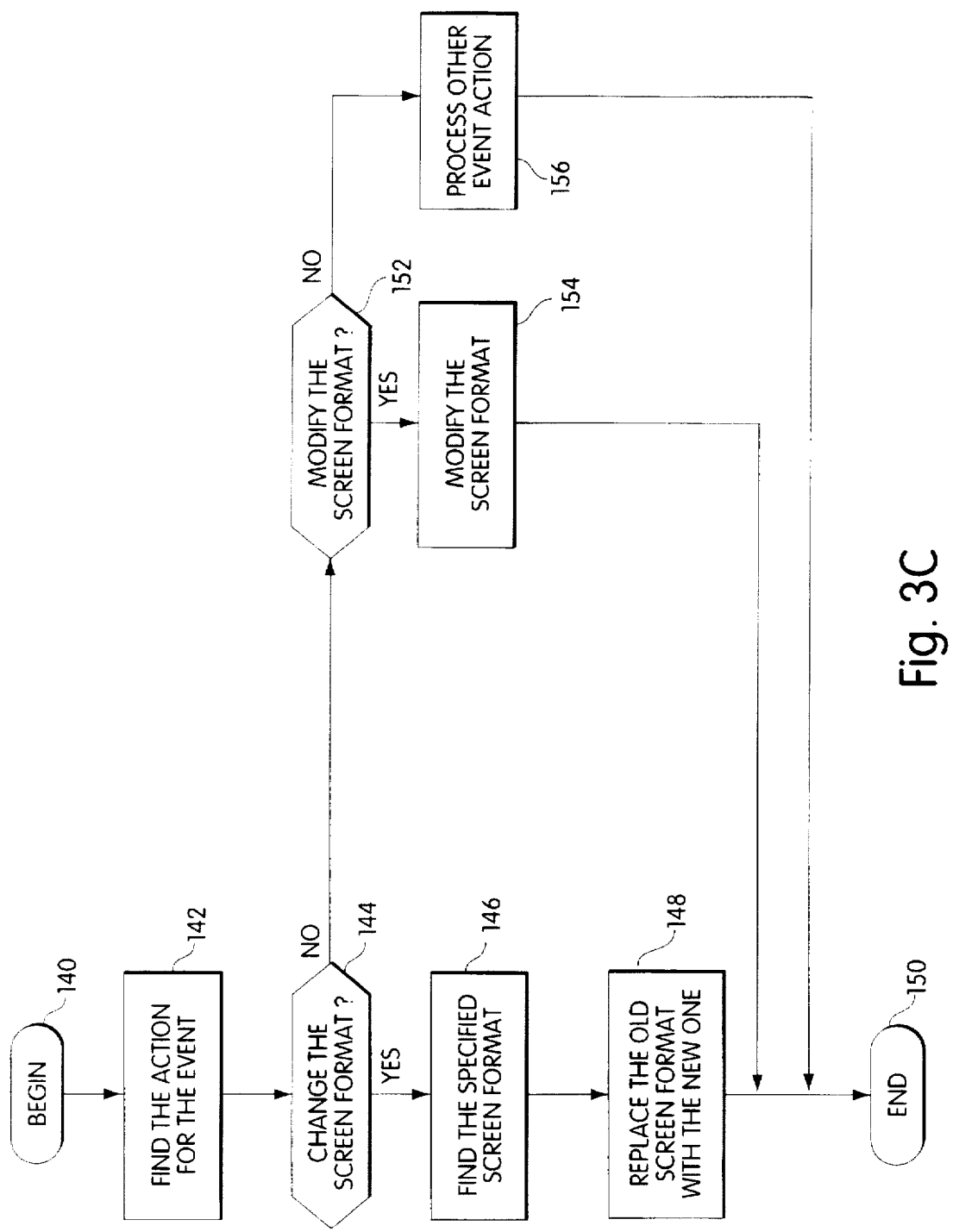
FIG. 3C is a flow chart describing the operation of the Subject System to process events.

FIG. 3C shows a flow chart of the operation of the Subject System to process events. The rocess begins at 140 and finds the action associated with the event at 142. If the action is to change the current screen format, as shown at 144, then the process finds the new screen format at 146, replaces the current screen format with the new one at 148, and ends at 150. If the action is to modify the current screen format at 152, then the process modifies the current screen format at 154 and ends at 150. If the action is not to modify the current screen format at 152, then it is processed at 156, and the process ends at 150.

Figure 3D:
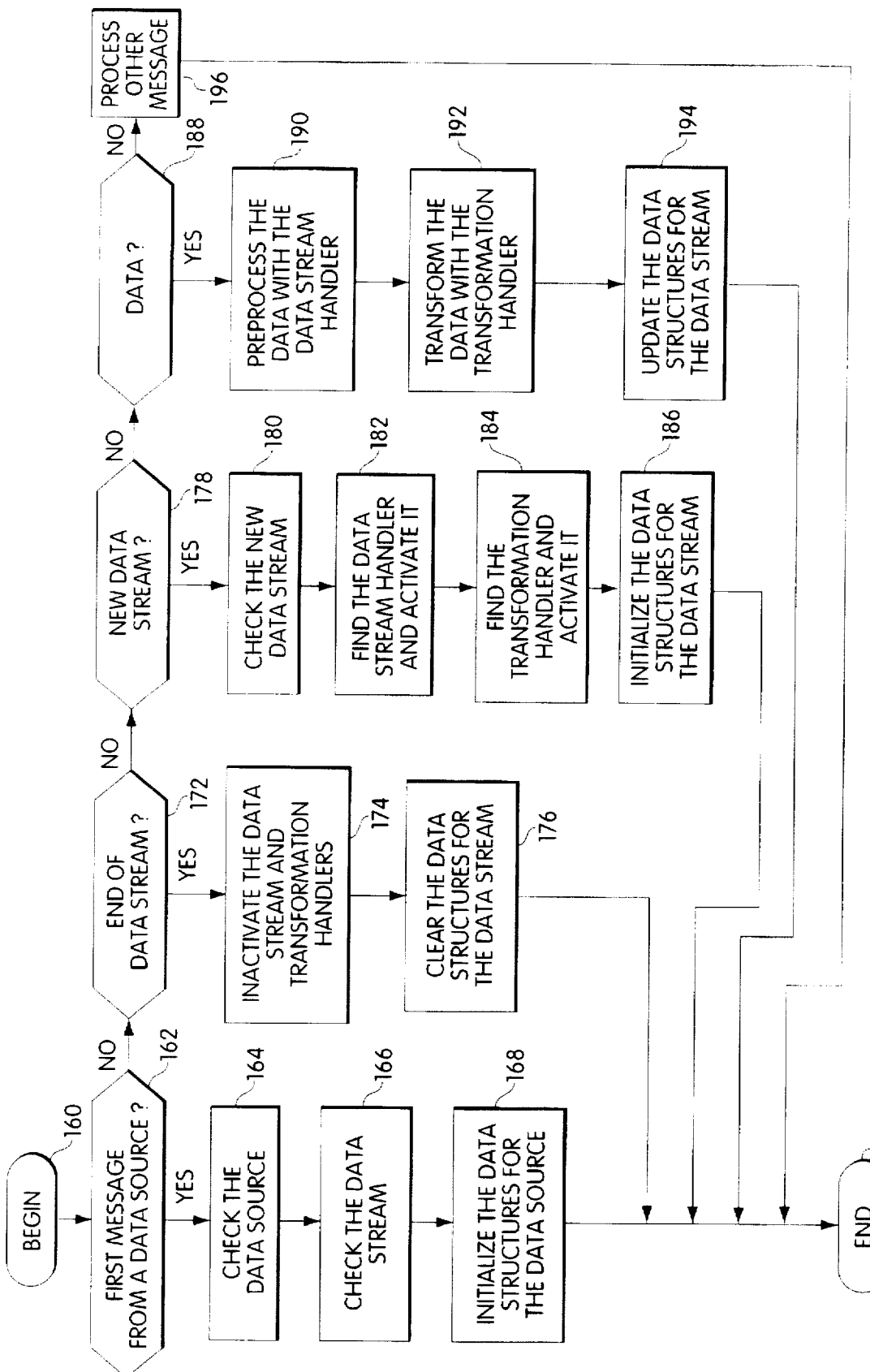
FIG. 3D is a flow chart describing the operation of the Subject System to process messages.

FIG. 3D shows a flow chart of the operation of Subject System to process messages form data sources. The process begins at 160. If the message is the first message from a data source at 162, then the data source is checked for its validity of communications at 164, and the data stream from the data source is checked for its validity at 166. If the data source and the data stream are validated, then the process initializes the data structures for the data stream from the data source at 168 and ends at 170. If the message is to notify the end of data stream at 172, then the process inactivates the data stream and transformation handlers for the data stream at 174, clears the data structures for the data stream at 176, and ends at 170. If the message is to start a new data stream at 178, then the new data stream is checked for its validity at 180. Then the process finds the data stream handler for the new data stream and activates it at 182, finds the transformation handler for the new data stream and activates it at 184, initializes the data structures for the new data stream at 186, and ends at 170. If the message is data at 188, then the process preprocesses it with the data stream handler at 190, transforms the preprocessed data with the transformation handler at 192, updates the data structures for the data stream at 194, and ends at 170. If the message is not data at 188, then it is processed at 196, and the process ends at 170.

Figure 3E:
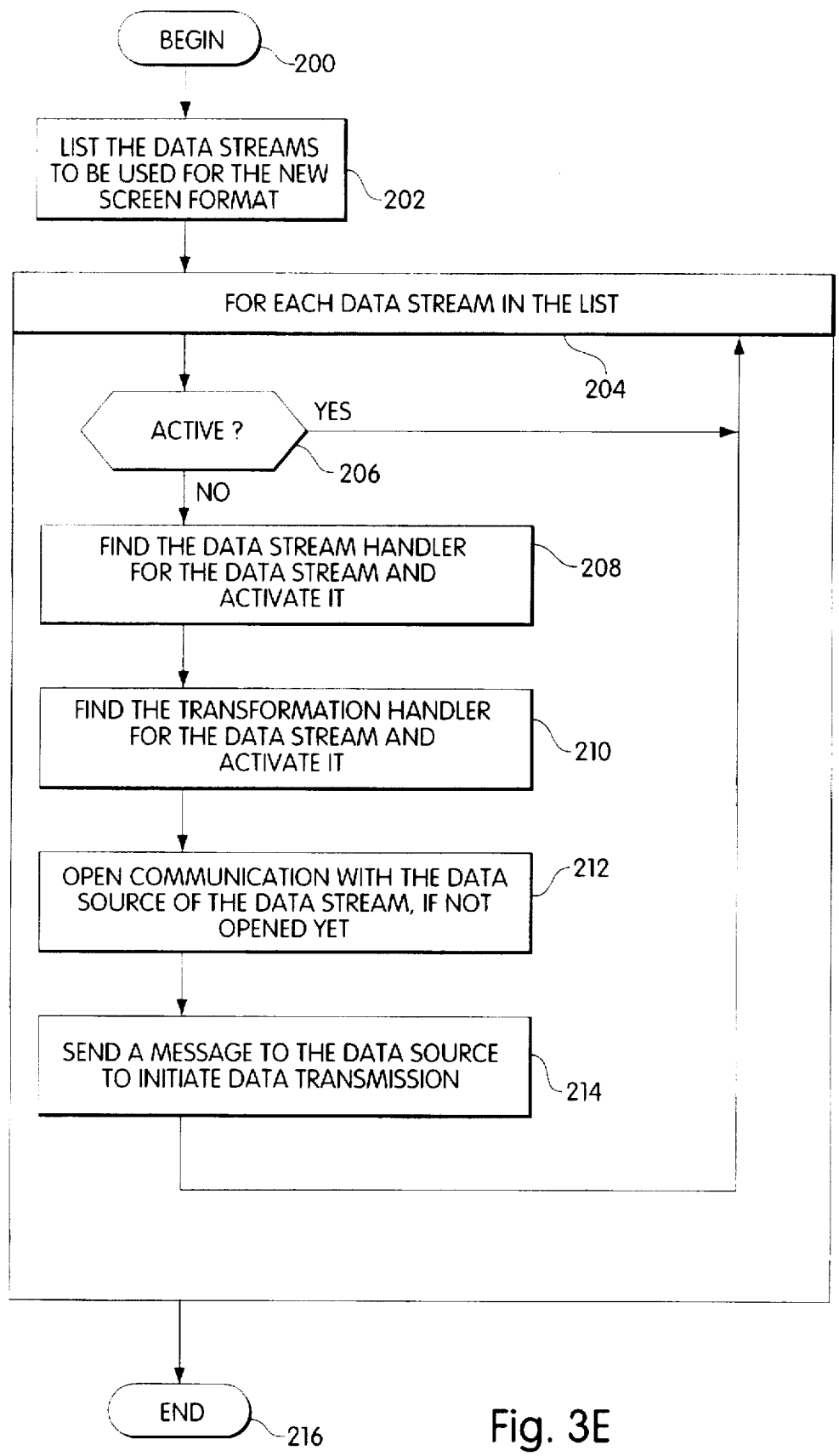
FIG. 3E is a flow chart describing the operation of the Subject System to activate communication with the data source of the data stream required for the current screen format.

FIG. 3E shows a flow chart of the detailed operation of the Subject System to activate the new screen format as the current screen format described in FIGS. 3C and 3D. The process starts at 200, in which the data streams to be used in the new screen format are listed at 202, each of the data streams in the list is processed at 204, and the process ends at 216. For each data stream in the list, if it is already active at 206, then it skips to the next data stream. If the data stream is not active at 206, then the process finds the data stream handler for the data stream and activates it at 208, finds the transformation handler for the data stream and activates it at 210, opens communication with the data source of the data stream at 212, if it is not opened yet, sends a message to the data source of the data stream to initiate data transmission at 214, and goes to the next data stream in the list.

Figure 3F:
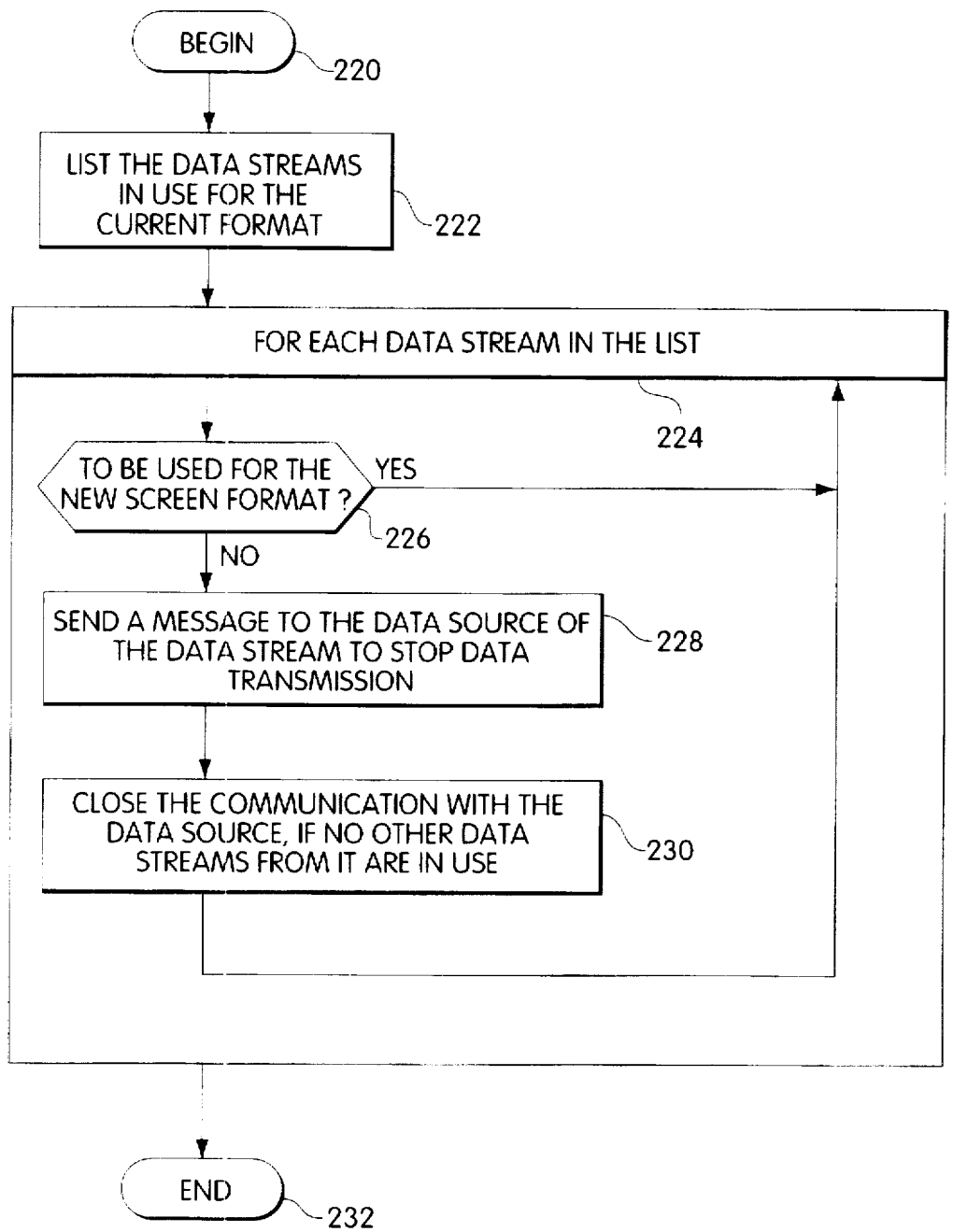
FIG. 3F is a flow chart describing the operation of the Subject System to replace the current screen format with a new one.

FIG. 3F shows a flow chart of the detailed operation of the Subject System to change the current screen format described in FIGS. 3C and 3D. The process begins at 222, lists the data streams in use for the current screen format at 220, and processes each data stream in the list at 224, and ends at 232. For each data stream in the list, if it is to be used for the new screen format at 226, then the process skips to the next data stream. If the data stream is not to be used for the new screen format at 226, then the process sends a message to the data source of the data stream to stop data transmission at 228, closes the communication with the data source of the data stream at 230, if no other data streams from the data source are in use, and goes to the next data stream in the list.

Figure 4A:
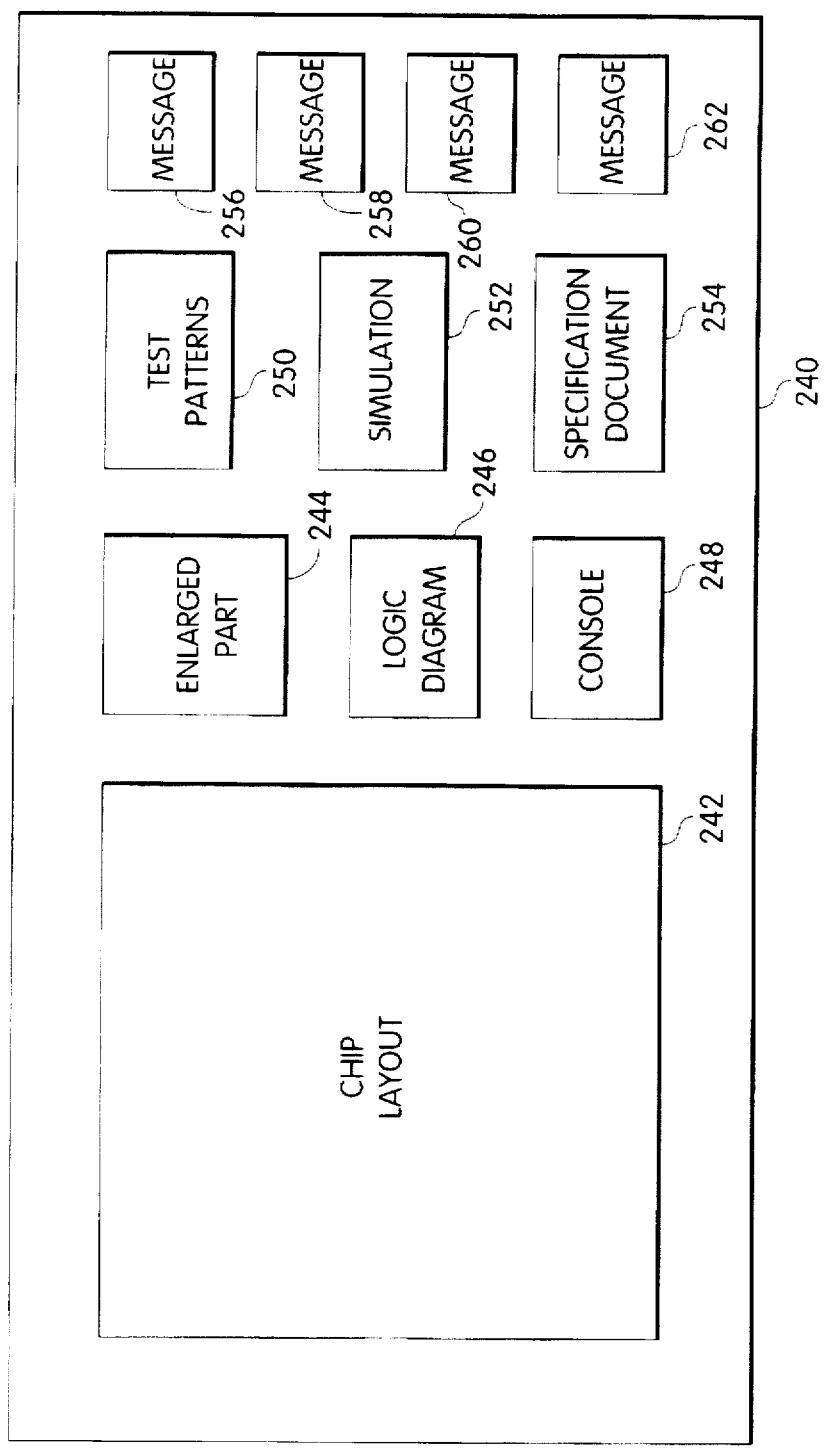
FIG. 4A is a diagrammatic illustration of an example of a screen layout for a VLSI design team.

FIG. 4A shows a screen layout example for a VLSI design team. Screen 240 consists of windows for the entire chip layout 242, enlarged part of the chip 244, logic diagram of the enlarged part 246, console 248, test patterns for the chip 250, simulation 252, part of specification document 254, and messages 256, 258, 260, and 262.

This example shows that data streams of different types come from different data sources and are presented on the screen in a manner the VLSI design team wants for their work. By way of example, while displaying the entire chip layout at 242, the team can enlarge a part of the VLSI chip at 244 when they get a message about a timing error detected during simulation from the simulation team at a remote site 256. They can also display the logic diagram related to the part at 246. These display operations are all dynamic. Test patterns at 250 and the specification document at 254 are sent from the test team and the documentation team, respectively, both at a remote site. Messages at 256, 258, 260, and 262 are from the simulation team, one of the design engineers, the company's management, and the test team, all at different sites. Note that a console 248 controls the screen layout.

Figure 4B:
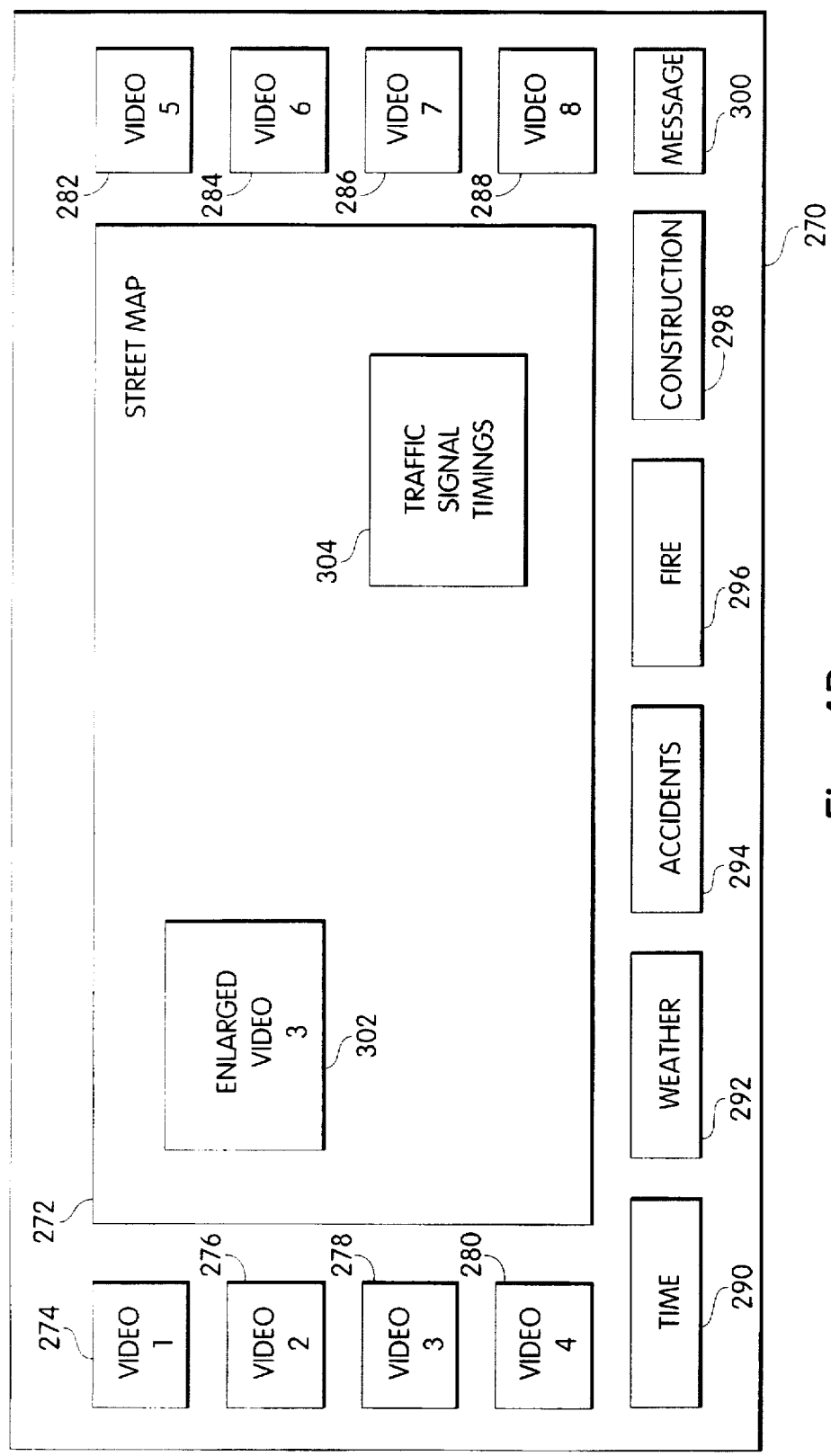
FIG. 4B is a diagrammatic illustration of an example of a screen layout for a traffic control team.

FIG. 4B is another example of a screen layout, here for a traffic control team. Screen 270 has a map window 272 at its center, video windows 274, 276, 278, 280, 282, 284, 286, and 288, each showing the traffic situation at a particular intersection, on its sides, and several information windows 290, 292, 294, 296, 298, and 300 at its bottom. An enlarged video window 302 is placed on map window 272 to allow the team to take a close look at the traffic situation of the intersection of interest. A window 304 is also placed on map window 272 to control the timings of the traffic signal at the intersection.

This example also shows that different data streams come from different sites. When the team receives a message about a traffic accident at an intersection, the video for which is displayed at 278, along with an indication 294 of an accident from the police department, it enlarges the scene of the intersection at 302 to look at the accident. When receiving the accident, the team can decide to change the timings of the traffic signals at the intersection, the result is to pop up a window 304 to specify signal timings. These operations are also performed in an event-driven manner.

Figure 4C:
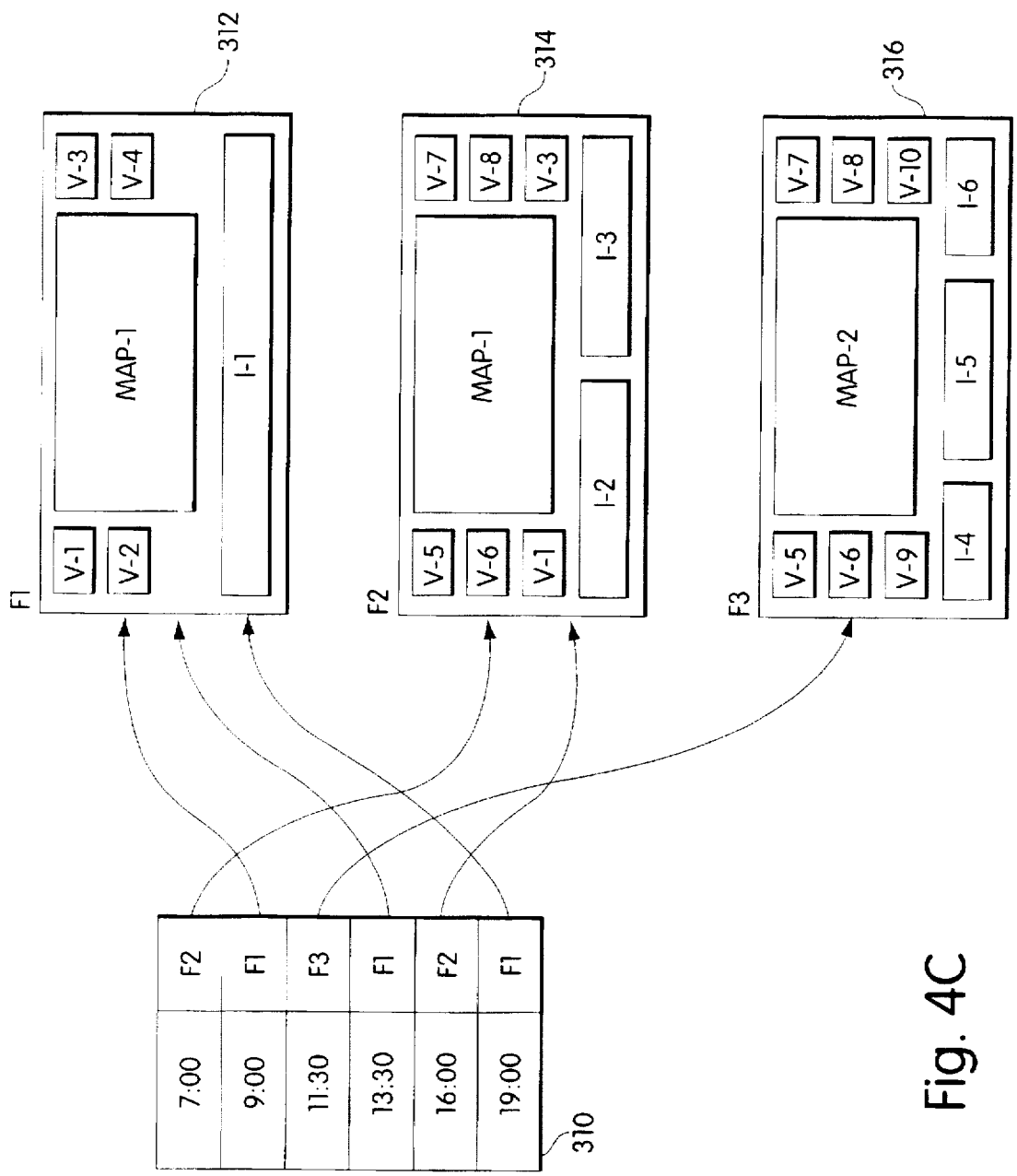
FIG. 4C is a diagrammatic illustration of the selection of screen formats in sync with the scheduled events for a traffic control team.

FIG. 4C shows that an event table 310 can be used to switch from one screen format to another at the occurrence of an event. Events produced at 9:00, 13:30, and 19:00 replace the current screen format with screen format 312, events at 7:00 and 16:00 with format 314, and an event at 11:30 with format 316. This event-driven screen format switching function eliminates the time-consuming and error-prone human operations.

From these examples, it can be seen that the display system is required to handle multiple data streams of different types from independent data sources at the same time and to transform images from these data streams dynamically to fit on the screen in the way the users want for their work. In order to switch from one screen layout to another by a command by the user or by an event, the display system is required to provide an easy way to accomplish these tasks without complicated manual operations.

Conventional display systems cannot meet these requirements, because they cannot take multiple data streams at the same time without the help of an external piece of equipment to merge them together into a single data stream. Moreover, conventional display systems do not have any information processing capability for transformation and handling of higher-level data than electrical signals. Conventional display systems can be combined with a computer to provide the similar functionality. However, since the computer is an independent system which is not tuned for display tasks, it is very difficult to handle multiple data streams with transformations at a reasonable cost/performance. Another problem with the conventional display systems is that they assume a screen of fixed-shape and fixed-size in terms of the number of pixels. They are thus not capable of displaying images on the screen of arbitrary shape and size.

How the display system of the present invention addresses these problems is best understood by the following description of one embodiment of the Subject System.

Figure 5:
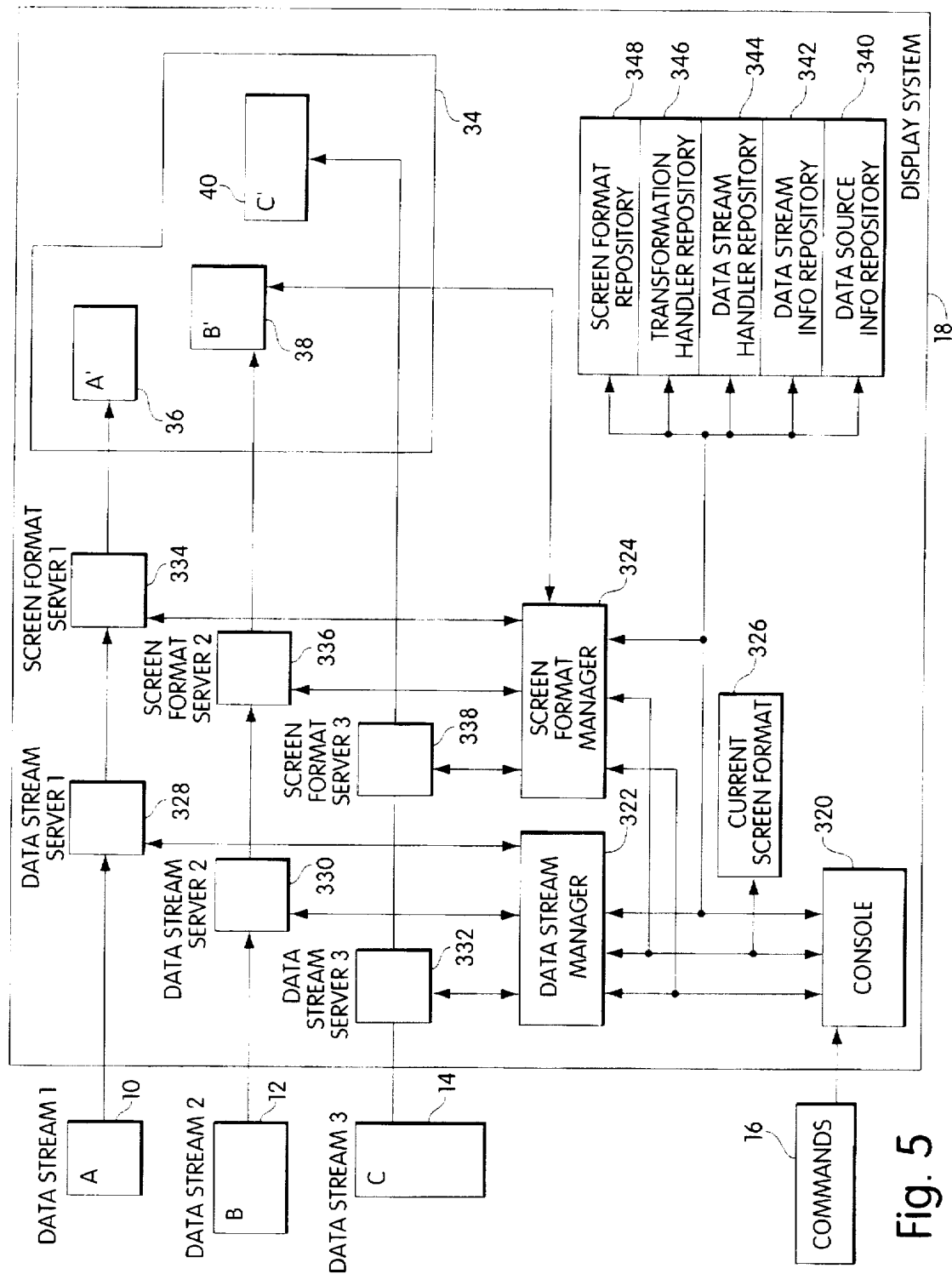
FIG. 5 is a block diagram of one embodiment of the Subject System consisting of a console, a data stream manager, a screen format manager, and a current screen format along with the repositories of data source information, data stream information, data stream handlers, transformation handlers, and screen formats.

FIG. 5 shows a block diagram of the Subject System in one embodiment. Display system 18 includes console 320, data stream manager 222, screen format manager 324, current screen format 326, data source information repository 340, data stream information repository 342, data stream handler repository 344, transformation handler repository 346, screen format repository 348, and screen 34. Console 320 receives commands 16 from the user and controls data stream manager 322, screen format manager 324, current screen format 326, and repositories 340, 342, 344, 346, and 348. Data stream manager 322 configures data stream servers 328, 330, and 332 for data streams 10, 12, and 14, respectively. Screen format manager 324 configures screen format servers 334, 336, and 338 for data streams 10, 12, and 14, respectively. Screen format servers 334, 336, and 338 receive preprocessed data from data stream servers 328, 330, and 332 to generate images 36, 38, and 40, respectively, on screen 34.

Data stream manager 322 configures a data stream server for a data stream to preprocess data from the data stream with an appropriate handler. Screen format manager configures a screen format server for the data stream to transform data preprocessed by the data stream server for the data stream into images on screen 34 with an appropriate transformation handler. Current screen format 326 describes these handlers to use for each data stream.

Data source information repository 340 is used mainly by data stream manager 322 to check the data source of a data stream. It includes information about the data source's location, protocol, rate, and so forth. Data stream information repository 342 is also used mainly by data stream manager 322 to check the characteristics of a data stream. It includes information about the data stream's data source, data type, rate, assumed size of screen, parameters for preprocessing, and so forth. Data stream handler repository 344 is used mainly by data stream manager to search a handler for preprocessing data from a data stream. Transformation handler repository 346 is used mainly by screen format manager 324 to search a handler for transformation of preprocessed data. Screen format repository 348 stores screen formats, one of which is choosen as the current screen format.

Using widely used technologies in operating systems, the console, the data stream manager, and the screen format manager can be implemented as processes which operate concurrently and communicate with each other using interprocess communications. Data stream servers and screen format servers can also be implemented as processes. Data structures shared between these servers are protected using well-known lock-unlock mechanisms.

Figure 6A:
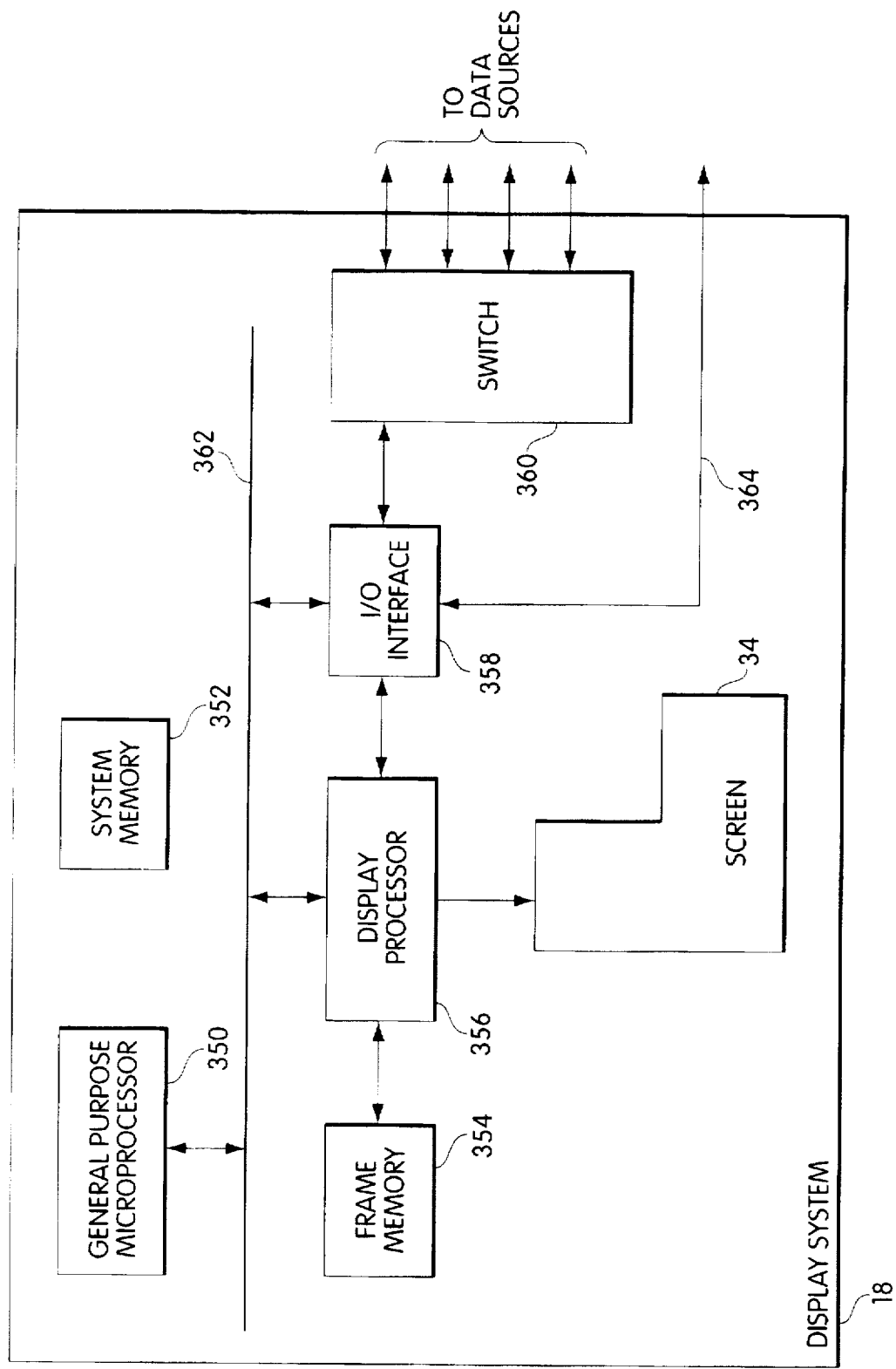
FIG. 6A is a block diagram of the hardware structure of the Subject System in one embodiment, consisting of a general-purpose microprocessor, a system memory, a frame memory, a display processor, an I/O interface, a switch, and a screen.

FIG. 6A shows a block diagram of the hardware structure of the Subject System in one embodiment. Display system 18 includes a general-purpose microprocessor 350, a system memory 352, a frame memory 354, a display processor 356, an I/O interface 358, a data switch 360, and screen 34. All the components except screen 34 and switch 360 are connected via bus 362. I/O interface 358 establishes connection 364 with the outside.

General-purpose microprocessor 350 executes programs stored in system memory 352. Programs are executed to maintain data structures for various operations as well as to control the hardware components of the Subject System. Frame memory 354 stores images in the form of pixels to be displayed on screen 34. Display processor 356 reads data from and writes data into frame memory 354, performing transformation operations as well as preprocessing operations for data streams. I/O interface 358 performs I/O operations by receiving data and sending messages through switch 360. It also communicates with the outside via line 364, which does not go through switch 360. Interface 358 may be used to access a set of disks which store programs to execute and data for the repositories.

Figure 6B:
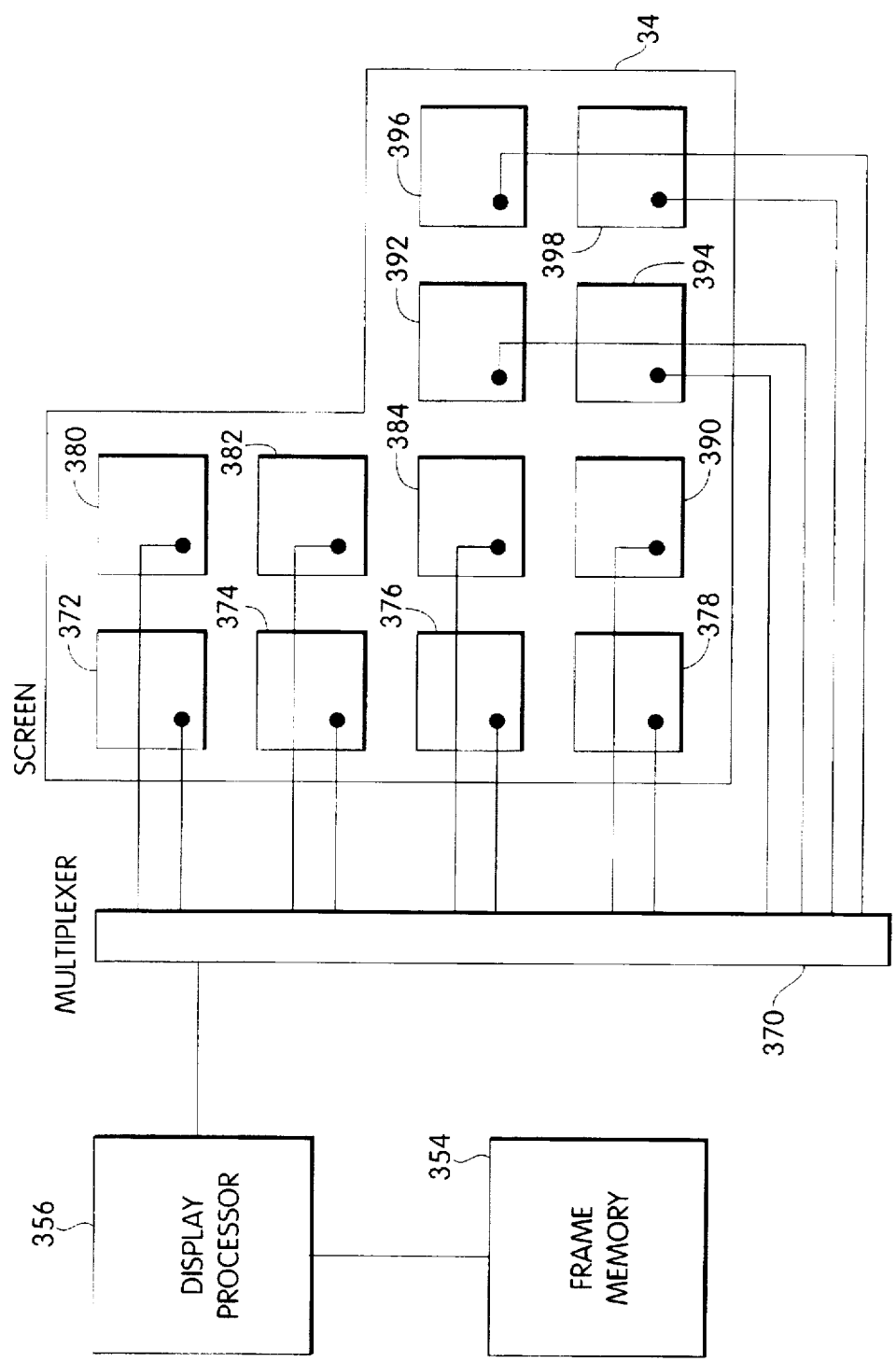
FIG. 6B is a block diagram of a titled screen for use in the Subject System.

FIG. 6B shows a block diagram of the tiled screen of the Subject System in one embodiment. Display processor 356 coupled with frame memory 354 is connected to a multiplexer 370, which is in turn connected to unit screens 372, 374, 376, 378, 380, 382, 384, 390, 392, 394, 396, and 398, which form single logical screen 34.

Frame memory 354 contains portions of memory for unit screens 372, 374, 376, 378, 380, 382, 384, 390, 392, 394, 396, and 398. In order to display part of image on a unit screen, display processor 356 writes pixel data of the part into the memory portion allocated to the unit screen in frame memory 354. In general, the display system recognizes the shape and size of its screen at the boot-up time and allocates memory portions for unit screens. Thus, the display system can display images on the screen of arbitrary shape and size. The shape and size of the screen is also reflected in screen formats, because a screen format specifies the screen area for each data stream.

Figure 7:
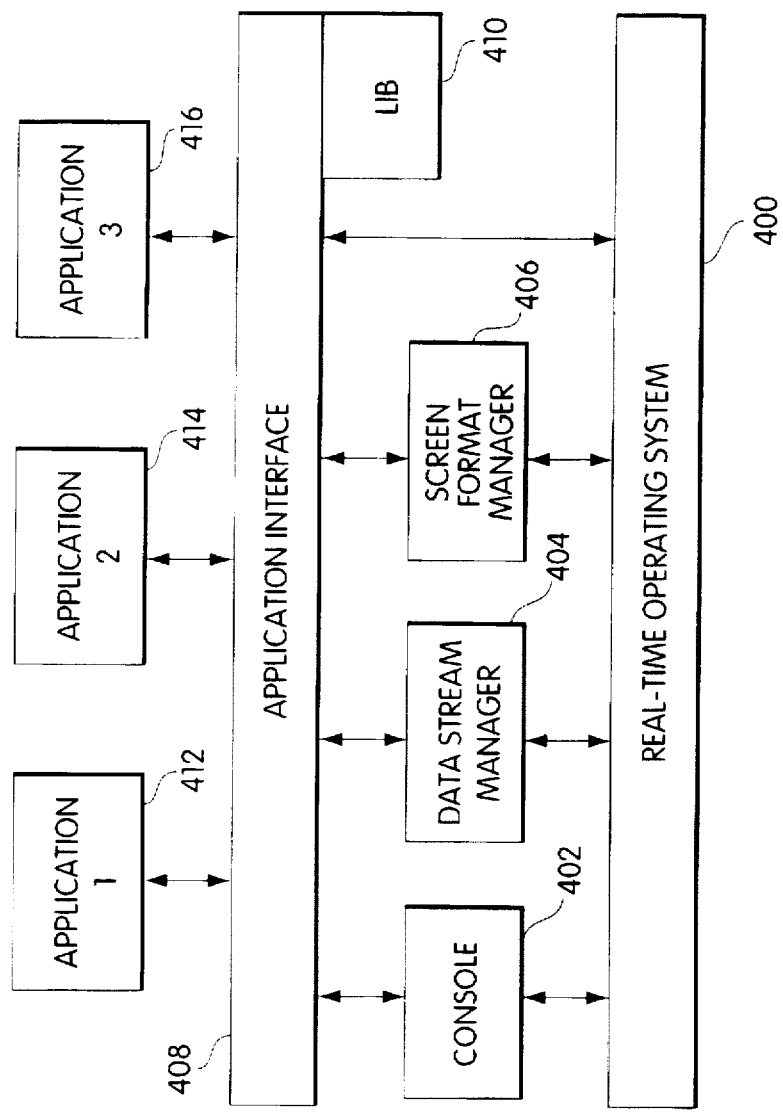
FIG. 7 is a diagrammatic illustration of the software components of the Subject System including a real-time operating system, a console, a data stream manager, a screen format manager, an application interface, a library, and applications.

FIG. 7 shows a block diagram of the software structure of the Subject System. A real-time operating system 400 controls the display system's hardware and provides a high-level interface to other software components, including a console 402, a data stream manager 404, a screen format manager 406, an application interface 408, and a library 410. Console 402, data stream manager 404, and screen format manager 406 are concurrent processes configured by real-time operating system 400 and realize the software functions of console 320, data stream manager 322, and screen format manager 324, respectively, of FIG. 5. Data stream servers and screen format servers are also concurrent processes which are dynamically configured by data stream manager 404 and screen format manager 406, respectively. An application interface 408 interfaces real-time operating system 400, console 402, data stream manager 404, screen format manager 406, and library 408 to provide a higher-level interface for applications 412, 414, and 416 in the form of data structures and system calls. An application is a program which controls the screen layout by providing a set of screen formats and specifying how to choose the current screen format from the set. For instance, the VLSI design example of FIG. 4A is one application, and the traffic control example of FIG. 4B is another application.

Figure 8A:
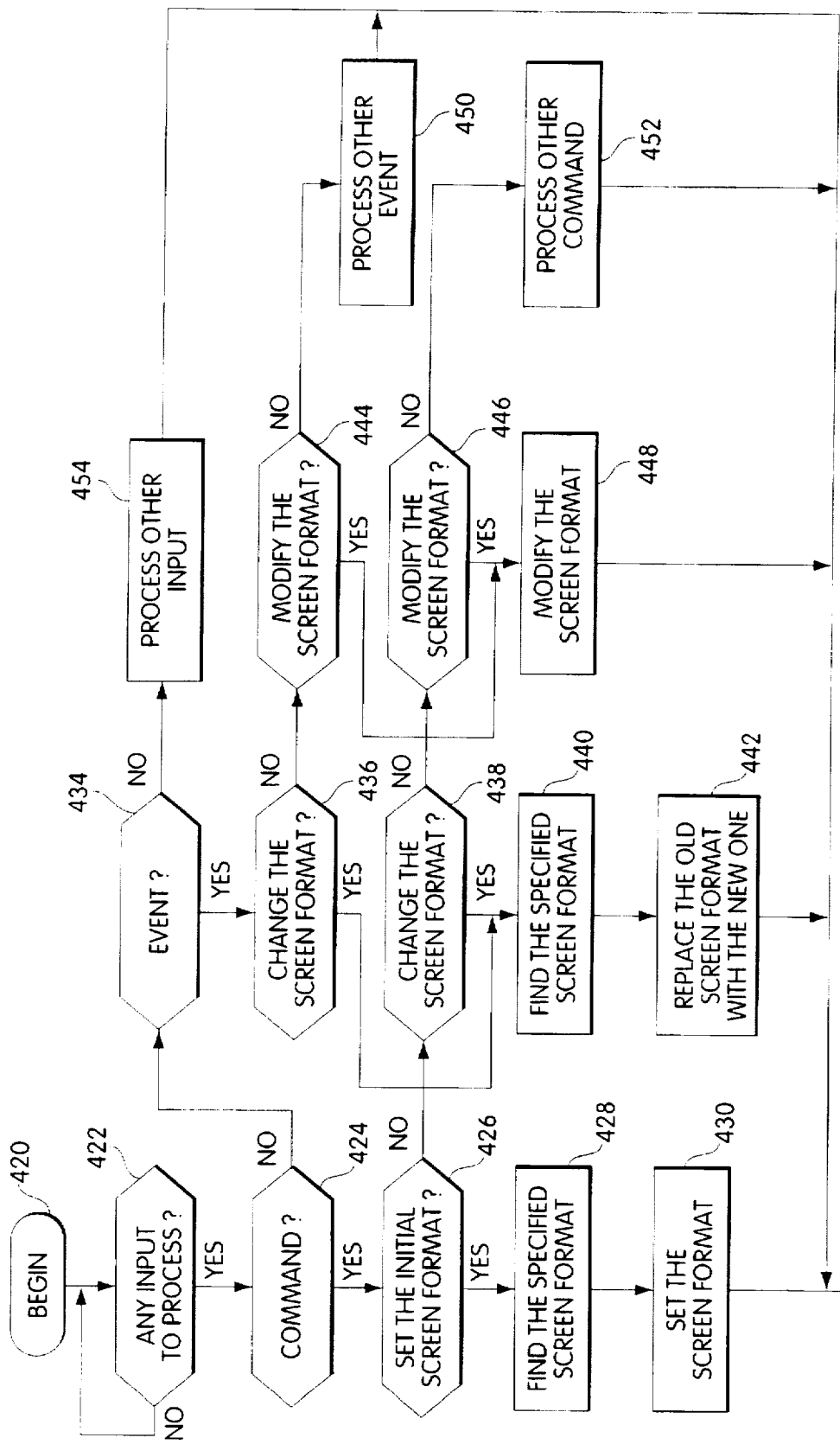
FIG. 8A is a flow chart describing the operation of the console of the Subject System.

FIG. 8A shows a flow chart of the operation of console 320 in FIG. 5. The process begins at 420 and repeats checks until the console receives an input to process at 422. If the input is a command at 424 and it is to set the initial screen format at 426, then the process finds the screen format specified by the command at 428, sets it as the current screen format at 430, and ends at 432. If the command is to change the current screen format at 438, or the input is an event at 434 and it is to change the current screen format at 436, then the process finds the new screen format at 440, replaces the current screen format with the new one at 442, and ends at 432. If the command is to modify the current screen format at 446, or the input is an event at 434 and it is to modify the current screen format at 444, then the process modifies the current screen format as specified by the command at 448 and ends at 432. If the command is not to modify the current screen format at 446, then it is processed at 452, and the process ends at 432. If the event is not to modify the current screen format at 444, then it is processed at 450, and the process ends at 432. If the input is not an event at 434, then it is processed at 454, and the process ends at 432.

Figure 8B:
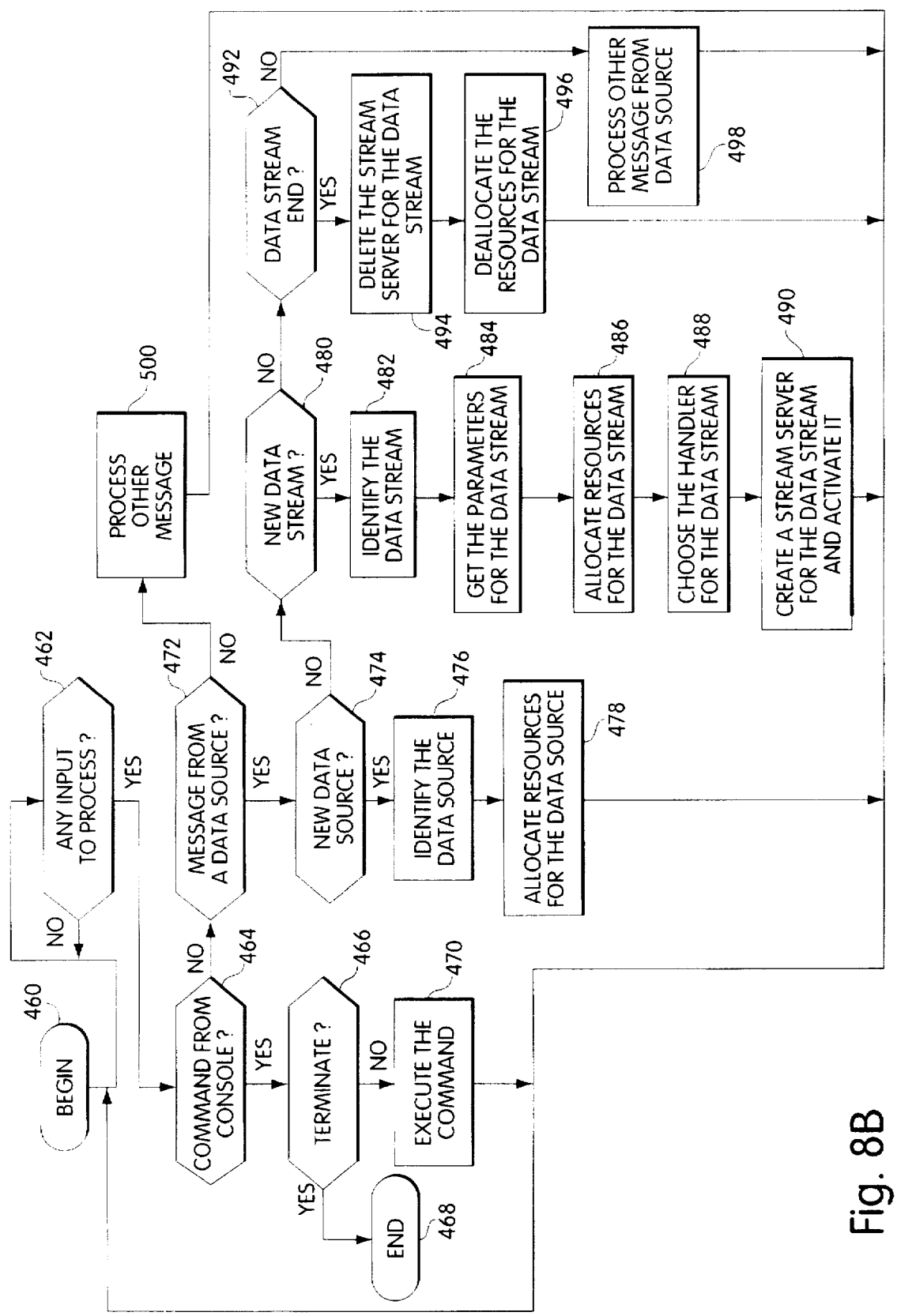
FIG. 8B is a flow chart describing the operation of the data stream manager of the Subject System.

FIG. 8B shows a flow chart of the operation of data stream manager 322 of FIG. 5. The process begins at 460 and repeats checks until the data stream manager receives an input to process at 462. If the input is a command from the console at 464 and it is to terminate at 466, then the process ends at 468. If the command is not to terminate at 466, then the process executes the command at 470 and waits for another input at 462. If the input is a message from a data source at 472 and the data source is new at 474, then the process identifies the data source at 476 by looking it up at the data stream information repository 342 of FIG. 5, allocates resources for communication with the data source at 478, and looks for another input at 462. If there is no message from a data source, other messages are processed as shown at 50. If the message is about a new data stream at 480, then the process identifies the data stream at 482 with the data stream information repository 342 of FIG. 5, gets the parameters for the data stream from the repository at 484, allocates resources to receive data from the data stream at 486, chooses a data stream handler for the stream for preprocessing at 488, creates a data stream server for the data stream and activates it at 490, and waits for another input at 462. If the message is to notify the end of the data stream at 492, then the process deletes the data stream server for the data stream at 494, deallocates the resources allocated to the data stream at 496, and waits for another input at 462. If the message is not to notify the end of data stream at 492, then it is processed at 498, and the process waits for another input at 462.

Figure 8C:
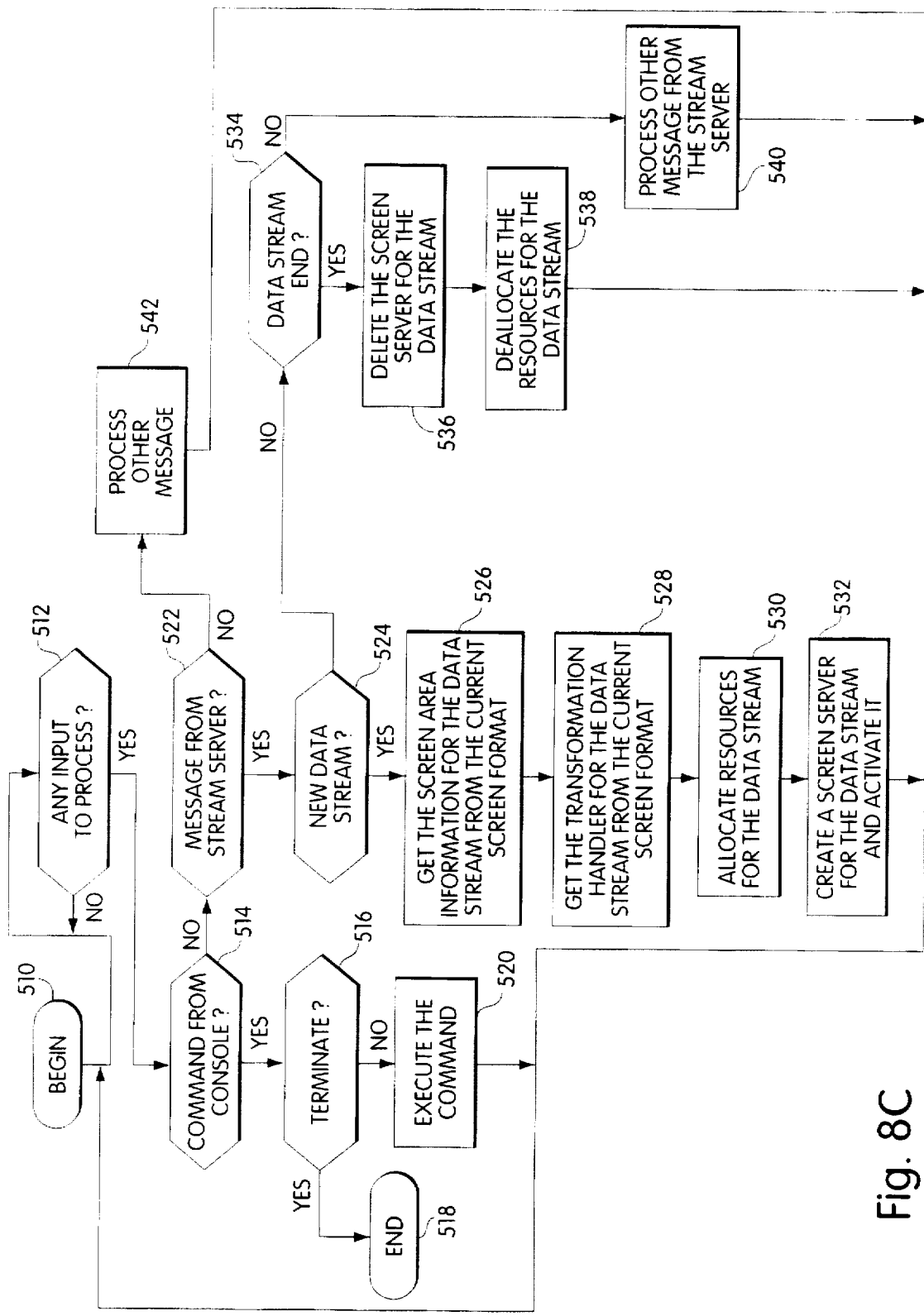
FIG. 8C is a flow chart describing the operation of the screen format manager of the Subject System.

FIG. 8C shows a flow chart of the operation of screen format manager 324 of FIG. 5. The process begins at 510 and repeats checks until the screen format manager receives an input to process at 512. If the input is a command from the console at 514 and it is to terminate, then the process ends at 518. If the command is not to terminate at 516, then it is executed at 520, and the process waits for another input at 512. If the input is a message from a data source at 522 and it is about a new data stream at 524, then the process gets the screen area information for the data stream from the current screen format at 526, gets the transformation handler for the data stream at 528 from transformation handler repository 346 of FIG. 5, allocates resources for the data stream at 530, creates a screen format server for the data stream and activates it at 532, and looks for another input at 512. If the message is about the end of a data stream, then the process deletes the screen server for the data stream at 536, deallocates the resources allocated to the data stream at 538, and waits for another input at 512. If the message is not about the end of a data stream at 534, then it is processed at 540, and the process waits for another input at 512. If the input is not a message at 522, then it is processed at 542, and the process waits for another input at 512.

Figure 9A:
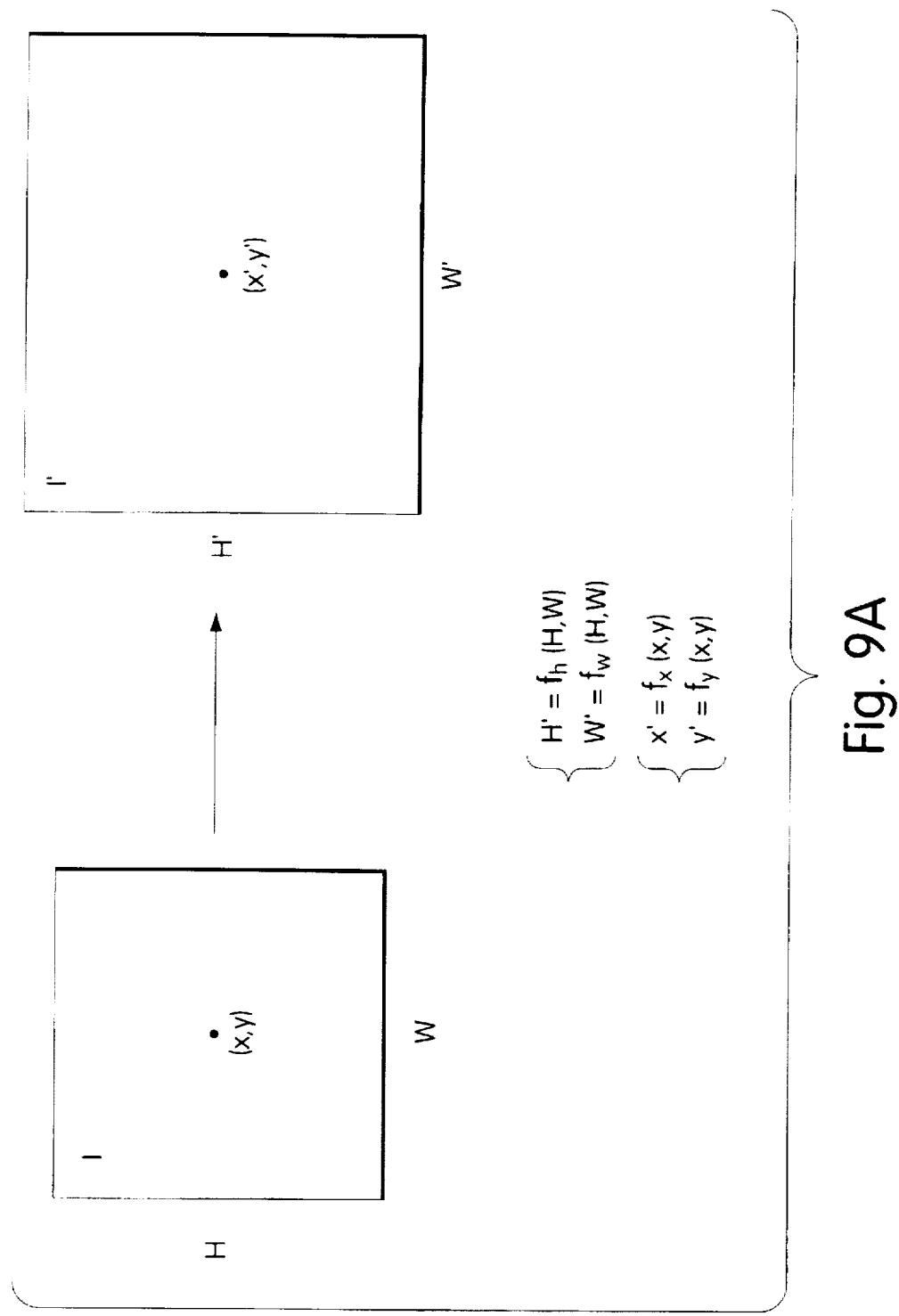
FIG. 9A is a diagrammatic illustration of image transformation performed by the Subject System.

FIG. 9A is a diagrammatic illustration of the image transformation performed in display system 18 of FIG. 5. Image I is the image assumed by a data stream, whose height and width are denoted by H and W, respectively. The location of a pixel in image I is represented by (x, y), where x and y are the x and y coordinates of the pixel in image I, respectively. Image I' is the image assumed at the screen area allocated to the data stream by the current screen format, whose height and width are denoted by H' and W', respectively. The location of a pixel in image I' is represented by (x', y'), where x' and y' are the x and y coordinates of the pixel in image I', respectively.

In general, H' and W' are functions of H and W as follows:

$$H'=f_h(H,W),$$

$$W'=f_w(H,W).$$

These functions determine the resizing factors of images. The x and y coordinates in image I', x' and y', are functions of x and y as follows:

$$x'=f_x(x,y),$$

$$y'=f_y(x,y).$$

These functions specify how to transform the x and y coordinates with which images are represented.

Figure 9B:
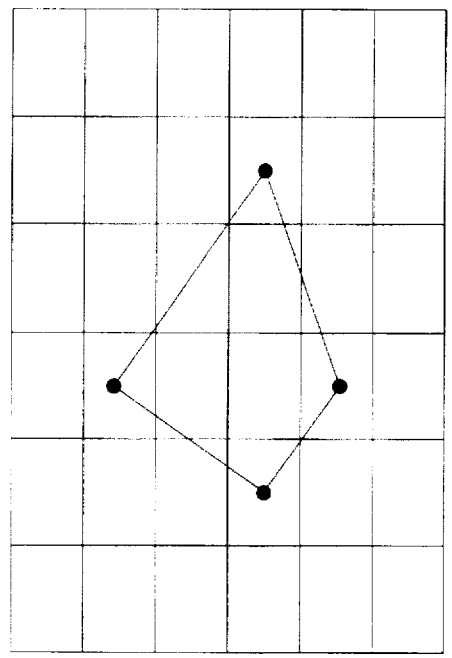
FIG. 9B is a diagrammatic illustration of an example of a resizing transformation performed by the Subject System.
Figure 9B:
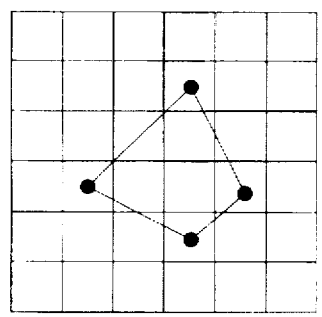

FIG. 9B shows a simple example transformation, where $H'=2H,$ $W'=3W,$ $x'=3x,$ $y'=2y.$ This transformation enlarges the image three times horizontally and two times vertically.

Figure 9C:
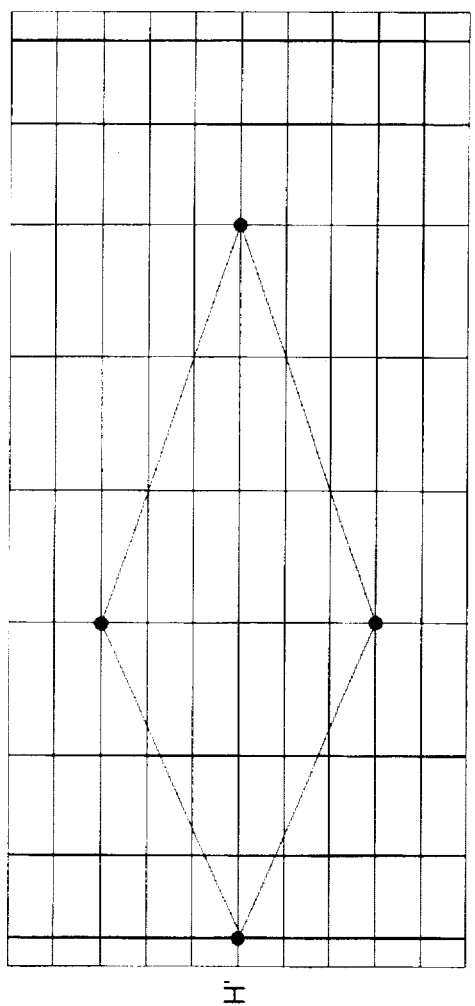
FIG. 9C is a diagrammatic illustration of another example of a transformation performed by the Subject System.
Figure 9C:
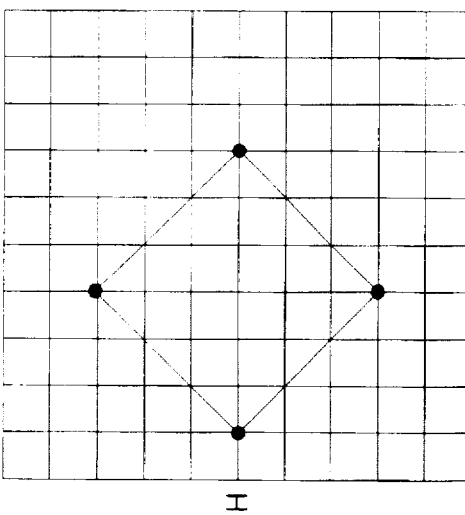

FIG. 9C shows another transformation example, where $H'=H,$ $W'=2W,$ $x'=W\{1+\sin(180x/W-90)\},$ $y'=y.$ This transformation keeps the original y coordinates of the image pixels, but transforms its x coordinates with a sine function.

Figure 10:
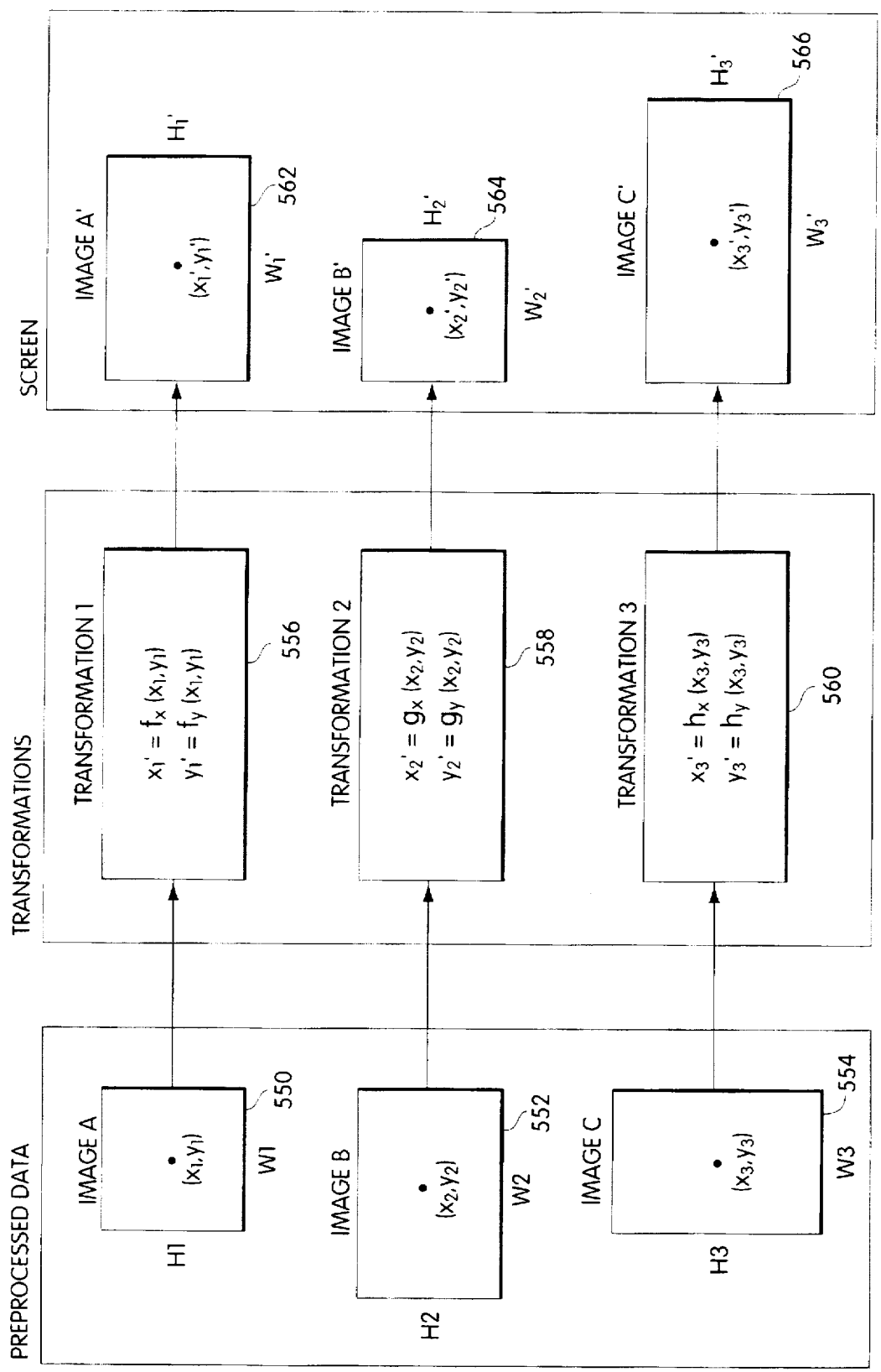
FIG. 10 is diagrammatic illustration of three different transformations for different data types performed concurrently in the Subject System.

FIG. 10 is a diagrammatic illustration of three different transformations performed concurrently on different preprocessed data in the Subject System. Images 550, 552, and 554, labeled A, B, and C, respectively, are preprocessed data and are transformed at 556, 558, and 560 into images A', B', and C', respectively shown at 562, 564, and 566, respectively. Transformations at 556, 558, and 560 are as follows:

Transformation 1 at 556: $x1'=f_x(x1,y1)$, $y1'=f_y(x1,y1)$

Transformation 2 at 558: $x2'=g_x(x2,y2)$, $y2'=g_y(x2,y2)$

Transformation 3 at 560: $x3'=h_x(x3,y3)$, $y3'=h_y(x3,y3)$

These transformations are performed concurrently with different transformation handlers used for different data streams.

It will be appreciated that while the Subject System has been described in terms of a single microprocessor, multiple microprocessors sharing the system memory can be used to enhance the system performance with different processes running on different microprocessors.

It will also be appreciated that while the Subject System has been described in terms of a single display processor, multiple display processors sharing the frame memory can be used to enhance the system performance.

In summary, what has been provided is a system for handling data streams of different types through preprocessing and transformation under the control of a format control unit which sets the preprocessing and transformation on the fly based on the types and parameters of data streams, the current screen format and commands relating to user-specified image locations, sizes, and other user-selected transformations. The system automatically accounts for different types of data streams and adapts them to the current screen format prior to placing the images on the screen. In one embodiment preprocessing is done by data stream servers, whereas the transformations are done by screen format servers under the control of respective managers.

Having above indicated several embodiments of the Subject Invention, it will occur to those skilled in the art that modifications and alternatives can be practiced within the spirit of the invention. It is accordingly intended to define the scope of the invention only as indicated in the following claims.

I claim:

1. In a display system having as an input different incoming data streams including video, graphical object, and still image data, apparatus for automatically detecting data type and formatting incoming data so as to permit displaying of said data in a changeable format, comprising:

a number of incoming data streams;

a display screen;

means for rendering images corresponding to the data carried by said incoming data streams on said display screen;

a number of data stream handlers interposed between said incoming data streams and said rendering means, each of said handlers having a predetermined preprocessing algorithm for establishing the format of the data to be output by a handler; and, means for detecting the data type of an incoming data stream and for changing the format of the corresponding data handler to output data formatted in accordance with both the position and area on said screen said data is to occupy and the detected data type, whereby incoming data is reformatted in accordance with active screen requirements for the display of said data, such that said data is rendered at the appropriate place on the screen with the appropriate characteristics.

2. The system of claim 1, wherein specifying means includes means operable by a user for designating said format.

3. The system of claim 1, wherein one of said data streams includes video images, and wherein said preprocessing means includes means for converting one of the characteristics of said video images into a different characteristic.

4. The system of claim 1, wherein one of said data streams includes compressed video images, and wherein said preprocessing means includes means for decompressing said compressed video images.

5. The system of claim 1, wherein one of said data streams includes graphical object descriptions, and wherein said preprocessing means includes means for generating a graphical object in accordance with a corresponding one of said graphical object descriptions.

6. The system of claim 1, wherein one of said data streams includes a still image, and wherein said preprocessing means includes means for converting the pixel representation of said still image into a different representation.

7. The system of claim 6, wherein said different representation is selected from the group consisting of color, shading, brightness, and resolution.

8. The system of claim 1, wherein one of said data streams includes a command script, and wherein said preprocessing means includes means for generating images from said command script.

9. The system of claim 1, wherein one of said data streams includes text, and wherein said preprocessing means includes means for generating a predetermined font for said text.

10. The system of claim 1, wherein said transforming means includes means for resizing said preprocessed pixel images.

11. The system of claim 1, wherein said transforming means includes means for rotation of said preprocessed pixel images.

12. The system of claim 1, wherein said transforming means includes means for processing said preprocessed pixel images in accordance with a predetermined algorithm.

13. The system of claim 1, and further including means coupled to said transforming means for specifying the layout of said preprocessed pixel images on said screen.

14. The system of claim 1, wherein said preprocessing means includes a data stream server and a data stream manager coupled thereto.

15. The system of claim 1, wherein said transforming means includes a screen format server and a screen format manager coupled thereto.

16. The system of claim 1, wherein said preprocessing means includes a data stream server and a data stream manager coupled thereto, wherein said transforming means includes a screen format server and a screen format manager coupled thereto, and further including means for coupling said data stream manager to said screen format manager.

17. The system of claim 16, wherein said format specifying means includes means for directly specifying said format and a console coupled between said direct format specifying means and both said data stream manager and said screen format manager for providing corresponding control signals thereto.

* * * * *